United States Patent [19]

Aoki

[11] Patent Number: 5,559,318
[45] Date of Patent: Sep. 24, 1996

[54] ENCODED SYMBOL READER WITH CALCULATION OF MAGNIFICATION

[75] Inventor: Harumi Aoki, Tokyo, Japan

[73] Assignee: Asahi Kogaku Kogyo Kabushiki Kaisha, Tokyo, Japan

[21] Appl. No.: 404,996

[22] Filed: Mar. 16, 1995

[30] Foreign Application Priority Data

Mar. 16, 1994 [JP] Japan .................................. 6-071577

[51] Int. Cl.⁶ ...................................................... G06K 7/10
[52] U.S. Cl. ......................... 235/454; 382/286; 382/298
[58] Field of Search ................................. 382/286, 298; 235/462, 463, 460, 454; 356/394

[56] References Cited

U.S. PATENT DOCUMENTS

| | | | |
|---|---|---|---|
| 3,805,028 | 4/1974 | Morton | 382/286 X |
| 4,074,258 | 2/1978 | Doré et al. | 235/454 X |
| 4,912,567 | 3/1990 | Nakajima et al. | 382/298 X |
| 4,939,354 | 7/1990 | Priddy et al. | 235/456 X |
| 4,973,830 | 11/1990 | Ouchi et al. | 235/463 |
| 5,048,106 | 9/1991 | Nakajima et al. | 382/298 |
| 5,189,292 | 2/1993 | Batterman et al. | 235/456 X |
| 5,288,986 | 2/1994 | Pine et al. | 235/460 X |

FOREIGN PATENT DOCUMENTS

| | | | |
|---|---|---|---|
| 4-69788 | 3/1992 | Japan | 235/472 |

*Primary Examiner*—Donald T. Hajec
*Assistant Examiner*—Jeffrey R. Filipek
*Attorney, Agent, or Firm*—Greenblum & Bernstein P.L.C.

[57] ABSTRACT

An encoded symbol reader for reading two-dimensional encoded symbols which can calculate a magnification of an image of the two-dimensional symbol. The encoded symbol is comprised of a n×n matrix of cells. The encoded symbol reader senses an image formed by an optical system, and detect a size of the formed image. Then, a magnification of the image is calculated based on the size of the image, and a length of the cell of the encoded symbol and a number of the cells.

12 Claims, 22 Drawing Sheets

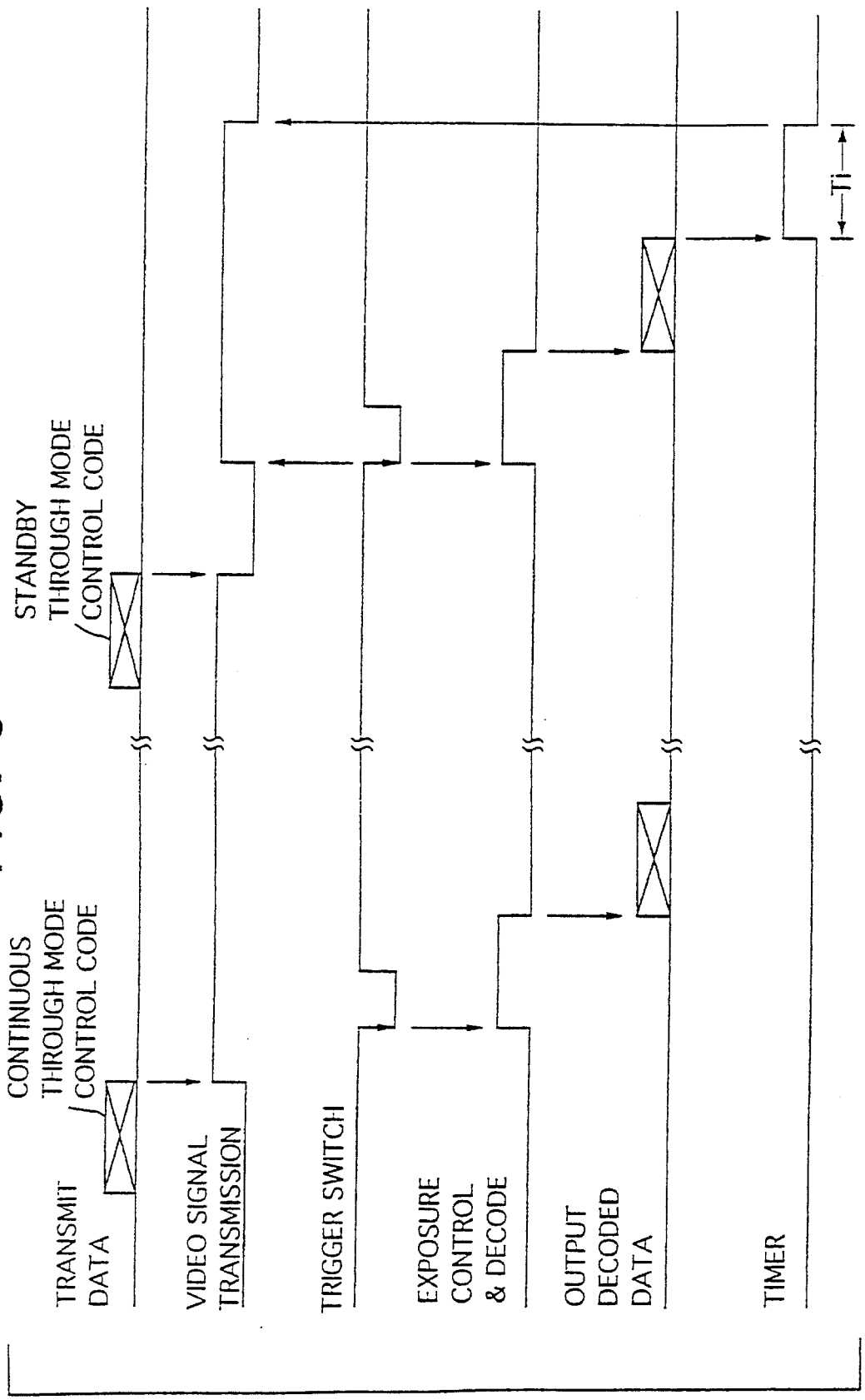

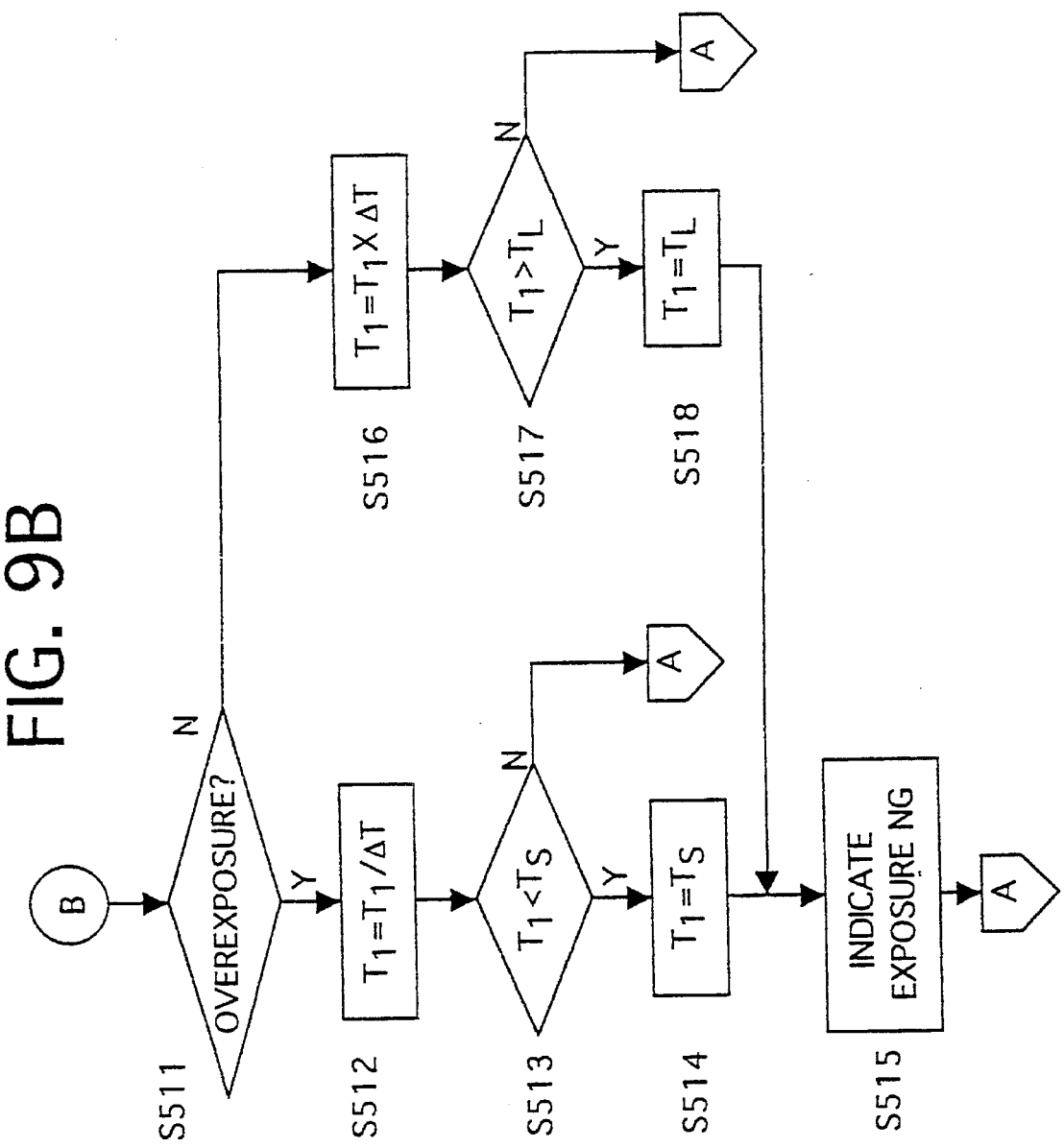

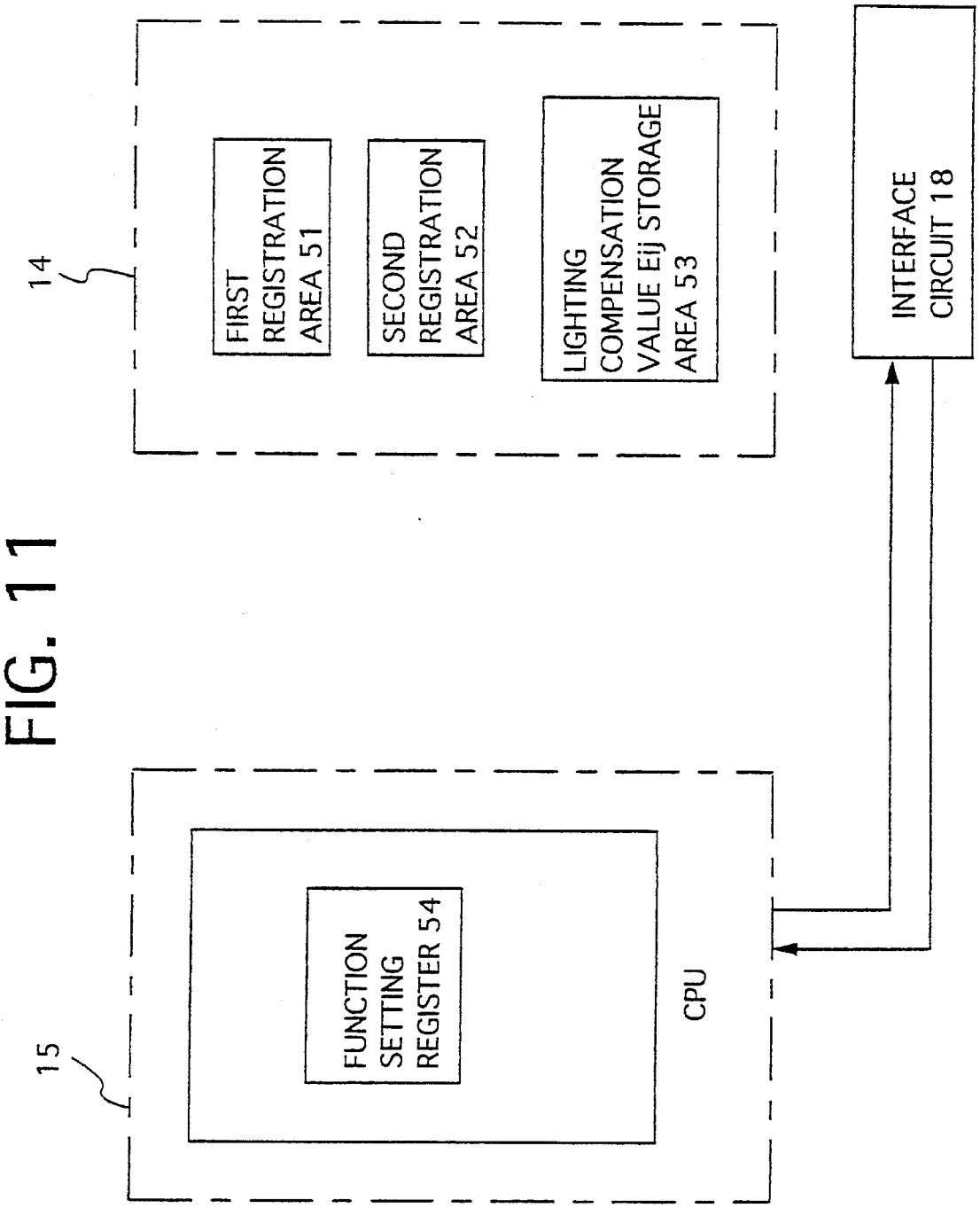

ENCODED SYMBOL READER WITH CALCULATION OF MAGNIFICATION

BACKGROUND OF THE INVENTION

The present invention relates to an encoded symbol reader used to decode encoded symbols such as two dimensional tessellated codes.

Recently, point-of-sale systems have employed encoded symbol readers in order to scan bar-code labels on to increase the speed at which products can be processed through a check-out line of a store. However, bar-code labels store data in only one direction (i.e., the scanning direction) and, therefore can only store a limited amount of data.

To overcome the problem of limited data storage, a new type of symbol which stores data in two directions has been proposed. This new type of symbol (hereinafter referred to as a two-dimensional symbol) uses a tessellated pattern to store the data.

However, in the conventional device, if the size of an image of the encoded symbol that is formed on an image sensor such as a CCD (charge coupled device) varies, the encoded symbol may not be decoded correctly.

SUMMARY OF THE INVENTION

It is therefore an object of the present invention to provide an improved encoded symbol reader which can accurately determine a size of a cell of the encoded symbol, and a number of cells in the encoded symbol, and therefore determine the size of the encoded symbol. Further, a magnification of an optical system used to read the encoded symbol can also be determined.

According to an aspect of the present invention, there is provided an encoded symbol reader for reading a two-dimensional encoded symbol, having a matrix of cells, the encoded symbol reader comprising means for reading an image of the encoded symbol, the reading means outputting an electrical signal corresponding to the read image; means for processing the output electrical signal; and means for storing information related to a processing of the output signal.

The reading means comprises means for sensing the image; and means for forming the image on the sensing means. Further, the processing means comprises: means for detecting a size of the image formed on the sensing means; and means for calculating a magnification of the image forming means based on the size of the image detected by the detecting means, and a size of the encoded symbol. In an embodiment, the image sensing means includes a CCD which outputs an electrical signal in accordance with the image formed thereon.

Additionally, the image forming means may comprise an optical system with which the image of the encoded symbol is formed on the sensing means. The optical system can include lenses, prisms, mirrors or any combination thereof. Further, the optical system can have an automatic focusing device to allow automatic focusing of the image of the encoded symbol on the image sensing means.

Further, the encoded symbol reader includes means for storing a magnification calculated by the calculating means. In the embodiment, the storing means may be a non-volatile memory.

Alternatively, the encoded symbol reader further comprises means for storing a size of a pixel of the sensing means. The detecting means detects a number of pixels of the sensing means corresponding to a length of the image formed on the sensing means. The size of the image is then detected based on the size and the number of the pixel of the sensing means.

Still further, the size of the encoded symbol is determined based on a length of the cell and a number of the cells in the encoded symbol.

Alternatively, the encoded symbol reader further comprises means for receiving data related to at least one of the length of the cell and the number of cells in the encoded symbol. The received data is sent from a computer connected to the encoded symbol reader.

In a preferred embodiment, the encoded symbol reader has a plurality of operating modes, and means for initiating a measurement operation. When a magnification measurement mode is selected and the initiating means is operated, the magnification of the image forming means is measured.

According to another aspect of the present invention, there is provided an encoded symbol reader which reads a two-dimensional encoded symbol, having a matrix of cells, the encoded symbol reader comprising means for forming an image of the encoded symbol; means for sensing the formed image; means for detecting a size of the image formed on the sensing means; means for calculating a magnification of the formed image based on the size of the image detected by the detecting means, and a length of the cell and a number of the cells in the encoded symbol; and means for storing the measured magnification.

According to yet another aspect of the present invention, there is provided a method for determining a magnification using an encoded symbol reader which reads a two-dimensional encoded symbol, the encoded symbol having a matrix of cells, the method comprising the steps of forming an image of encoded symbol; sensing the formed image; detecting a size of the image formed on the sensing means; calculating a magnification of the formed image based on the size of the image detected by the detecting step, and a length of the cell and a number of the cells in the encoded symbol; and storing the measured magnification.

According to further aspect of the invention, there is provided an encoded symbol reader which reads a two-dimensional encoded symbol, having a matrix of cells, the encoded symbol reader comprising: means for forming an image of the encoded symbol; means for sensing the formed image; means for storing image magnification, a number cells, a size of the cell; and means for decoding the encoded symbol in accordance with the image sensed by the sensing means, the image magnification, the number of cells, and the size of cells stored in the setting means.

DESCRIPTION OF THE ACCOMPANYING DRAWINGS

FIG. 6 is a timing chart illustrating an operation of the continuous through mode and the standby through mode procedures;

FIGS. 9A and 9B show a flowchart of an illumination measurement mode;

FIG. 11 shows a configuration of memory used in the encoded symbol reader shown in FIG. 1;

FIG. 15 shows a chart of a decoding procedure when an image reverse procedure is on;

DESCRIPTION OF THE EMBODIMENTS

Figure 1:
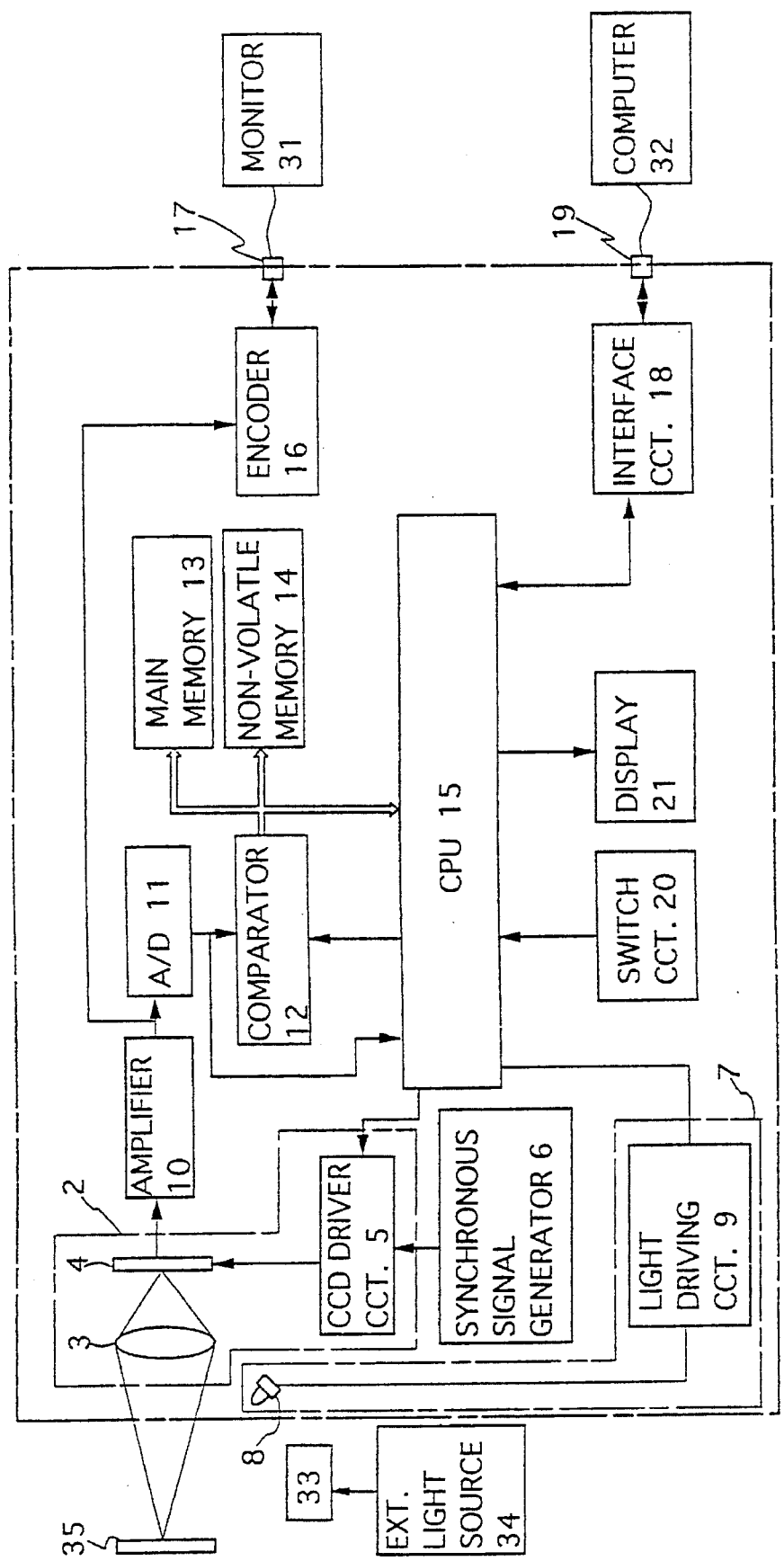
FIG. 1 shows a block diagram of an encoded symbol reading device according to the present invention.

FIG. 1 shows a block diagram of an encoded symbol reader 1 according to the present invention. The encoded symbol reader 1 has a light projecting unit 7 for illuminating an encoded symbol 35 to be read. A reading unit 2 forms an image of the encoded symbol 35 and converts the image to an electrical signal. The reading unit 2 is controlled by a CPU 15 and a synchronous signal generator 6.

The electrical signal output by the reading unit 2 is amplified by the amplifier 10 and digitized by the A/D converter 11. The amplified signal is also fed to an encoder 16 where it is encoded and sent via a video terminal 19 to an external monitor 31 for viewing. The digitized signal is compared with a threshold level by a comparator 12, and a signal is output on a bus which is connected to the CPU 15, a main memory 13 and a non-volatile memory 14.

As shown in FIG. 11, the non-volatile memory 14 has a first registration area 51 for storing function setting values, a second registration area 52 for storing initial function setting values, and a compensation value storage area 53 for storing brightness compensation values Eij.

A switch circuit 20 in the form of a trigger switch provides a trigger signal to the CPU 15, when the encoded symbol 35 is to be read. A display 21 which is built into the encoded symbol reader 1, displays information related to the encoded symbol being read after processing by the CPU 15. The processed signal can also be sent to a computer 32 via an interface circuit 18 and a interface terminal 19.

The reading unit 2 consists of a CCD (Charge Coupled Device) 4, an optical system 3 for converging light from a reading area of the encoded symbol 35 onto the CCD 4, and a CCD driving circuit 5. The optical system 3 is well known and uses lenses, prisms filters and other optical elements.

The CCD 4 has a plurality of light receiving elements arranged in a matrix. Each light receiving element of the CCD 4 accumulates electrical charge in proportion to an amount of light received. The accumulated charge is transferred sequentially at a predetermined interval and output as a CCD output signal, which will be processed (described later).

The light projecting unit 7 includes a light source 8 and a driving circuit 9. The light source 8 may be an LED, or any other light emitter such as a laser diode or halogen lamp.

The CPU 15 controls the operation of the entire system of the encoded symbol reader 1. More specifically, the CPU 15 controls the CCD drive circuit 5, the light source drive circuit 9, the amplifier 10, the A/D converter 11, the comparator 12, the main memory 13, the non-volatile memory 14 and the encoder 16. Some of the control lines from the CPU 15 to the various devices described above, are not shown in FIG. 1.

The display unit 21 may include an LCD display, a green LED and a red LED.

A symbol reading area is an area on a reference plane (a plane which includes the encoded symbol 35) where light which is projected by the light projecting unit 7, and then reflected by the encoded symbol 35, can be received by the light receiving unit 2. In general, the encoded symbol 35 has a data area and a frame area. In the data area, n×n (n is an integer greater than one) black or white (or transparent) small cells are arranged in matrix. The luminance of light reflected form the cell represents 0 (zero) or 1 (one) in binary. A combination of the black and white cells define desired information. The configuration of the encoded symbol is not limited to that described above. Any type of two-dimensional symbol code can be used.

A brief description of an operation of the encoded symbol reader 1 is given below.

Figure 2:
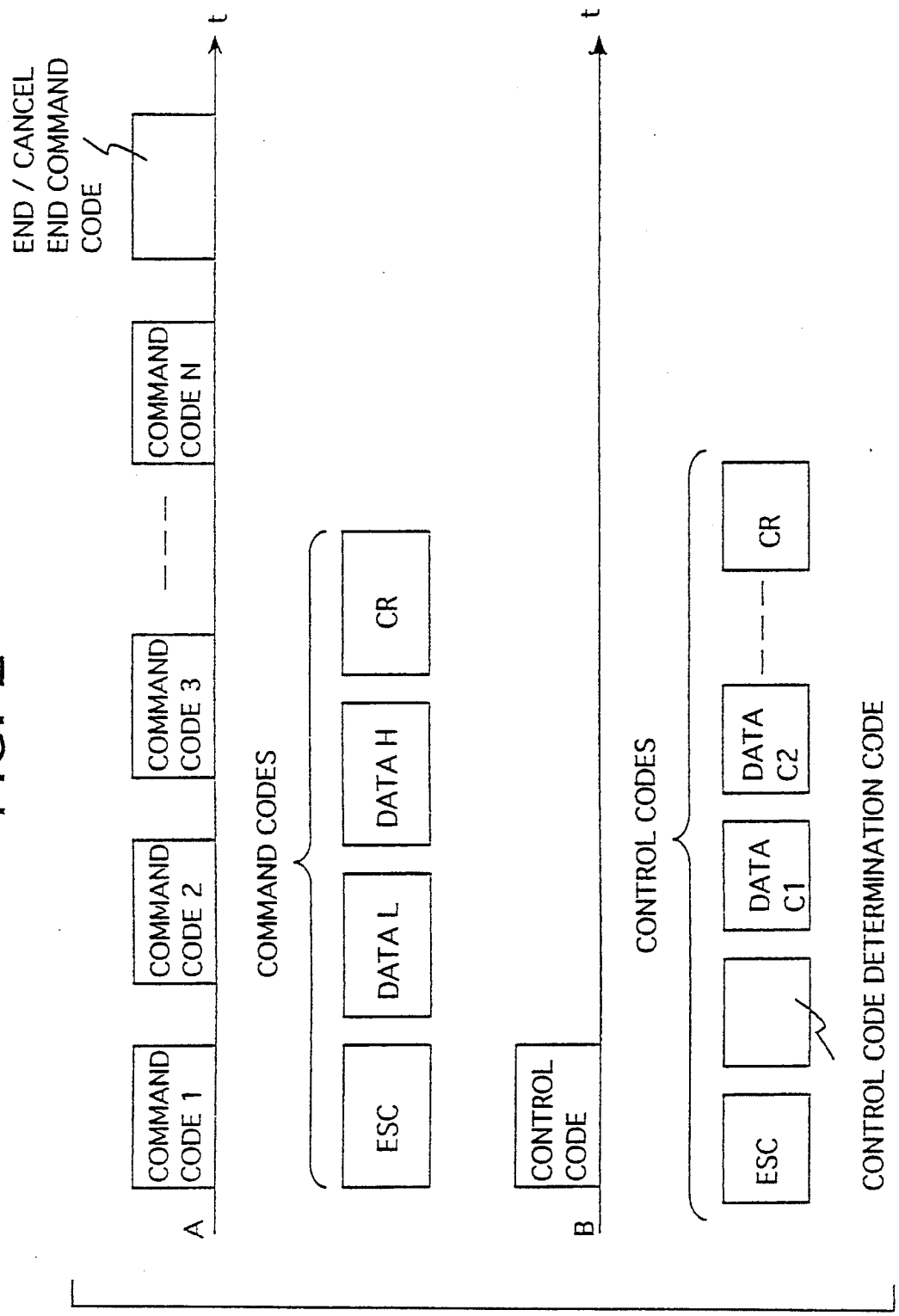
FIG. 2 shows a configuration of command and control codes used by the encoded symbol reader shown in FIG. 1.

A communication interruption procedure (described later) of the encoded symbol reader 1 is performed. This involves the downloading of data from the computer 32 to the CPU 15 thereby setting a mode of operation. The encoded symbol reader 1 may have many modes of operation. These include an illumination measurement mode, a magnification measurement mode, a continuous through mode, a standby through mode, and an automatic threshold mode. The settings of each mode are executed by downloading predetermined communication data to the CPU 15 from the computer 32. The communication data includes command codes and control codes. Examples of these are shown in FIG. 2.

After the mode of operation is set and the trigger switch 20 is activated, the drive circuit 9 drives the light source 8 to emit light onto the encoded symbol 35. The light reflected by the encoded symbol 35 is focused on the light receiving surface of the CCD 4 through the optical system 3. The synchronous signal generating circuit 6 generates a horizontal synchronous signal and a vertical synchronous signal which are then transmitted to the CCD drive circuit 5.

The CCD 4 is driven by the CCD drive circuit 5, and an image signal (analog) corresponding to the received light is output by the CCD 4. The light receiving elements of the CCD 4 accumulate electrical charge which is then transmitted as the CCD output signal under the control of the CCD drive circuit 5. The CCD output signal transmitted by the CCD 4 is amplified by the amplifier 10, converted into a digital image signal by the A/D converter 11, and then fed to the comparator 12.

In the comparator 12, the digital image signal is compared with a predetermined threshold value Sij and converted into one-bit binary data. The one-bit data is written in the main memory 13 at an address determined by an address counter included in the system controller 15.

After the data is written to the main memory 13, the stored one-bit data is read out of the main memory 13, and then processed (i.e., image processing and decoding are executed). The processed data is transmitted to the interface terminal 19 through the interface circuit 18, and then sent to the computer 32. In the computer 32, the received data is processed (i.e., the data is stored, and/or a predetermined calculation is performed).

The analog image signal output by the CCD 4 and amplified by the amplifier 10 is also transmitted to the encoder 16 as a monitor signal. The encoder 16 generates a video signal such as an NTSC signal which can be used for reproducing an image on the monitor (CRT) 31, according to the input monitor signal and synchronous signals. The video signal is transmitted to the monitor 31 through the video terminal 17. With this construction, the reading area of the encoded symbol 35 can be observed on the monitor 31.

Functions such as setting a timer interval Ti (described later), the turning on/off of an image reversal mode and the turning on/off of the automatic threshold mode, are controlled with the command codes. The command codes are illustrated by communication data A shown in FIG. 2.

An operational mode of the encoded symbol reader 1 is set based on control codes received by the encoded symbol reader 1.

The control codes include an illumination measurement mode control code, a magnification measurement mode control code, a continuous through mode control code, and standby through mode control code. The control codes are illustrated by communication data B shown in FIG. 2.

The communication data A shown in FIG. 2 sends command code 1 through command code N, and then an "END"/"CANCEL END" command. Each of command codes 1, 2, ..., and N includes an escape code (ESC), data L, data H, and a carriage return (CR) code.

The "END"/"CANCEL END" command distinguishes the END or CANCEL END conditions. If the "END" command is output, all of command codes 1, 2, ..., N are valid. If the "CANCEL END" command is output, none of them are valid (i.e., command codes 1, 2, ..., N are all canceled).

Communication data B, which sends control codes, includes an escape code (ESC), a control code determination code, data C1, data C2, ..., and a carriage return (CR) code.

The control code determination code is a code for identifying whether the communication data is data which includes command codes or control codes. For example, if the control code determination code has been identified as "P", then the presence of the code "P", will indicate the presence of the control code.

Figure 3A:
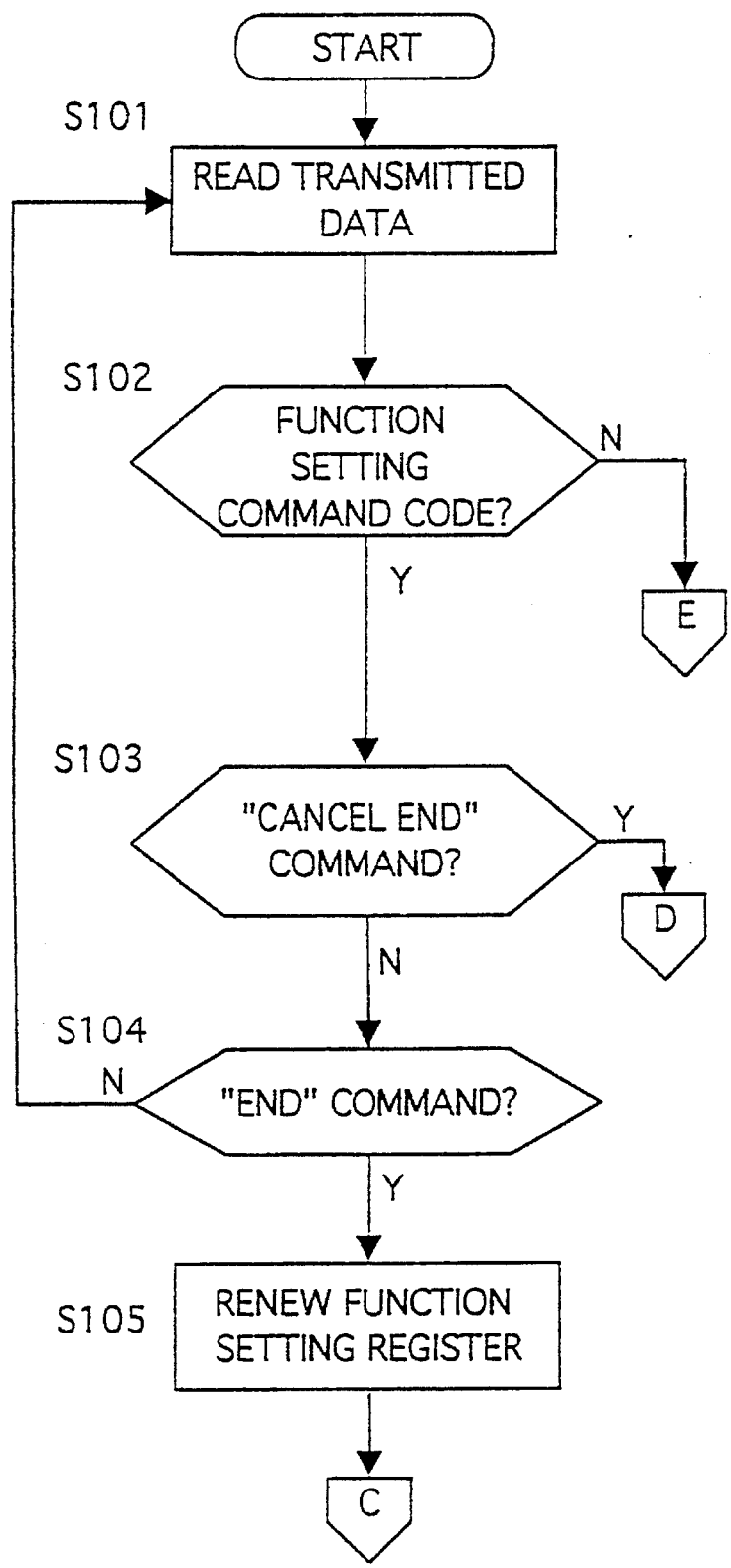
FIGS. 3A, 3B and 3C show a flowchart of a communication interruption procedure.
Figure 3B:
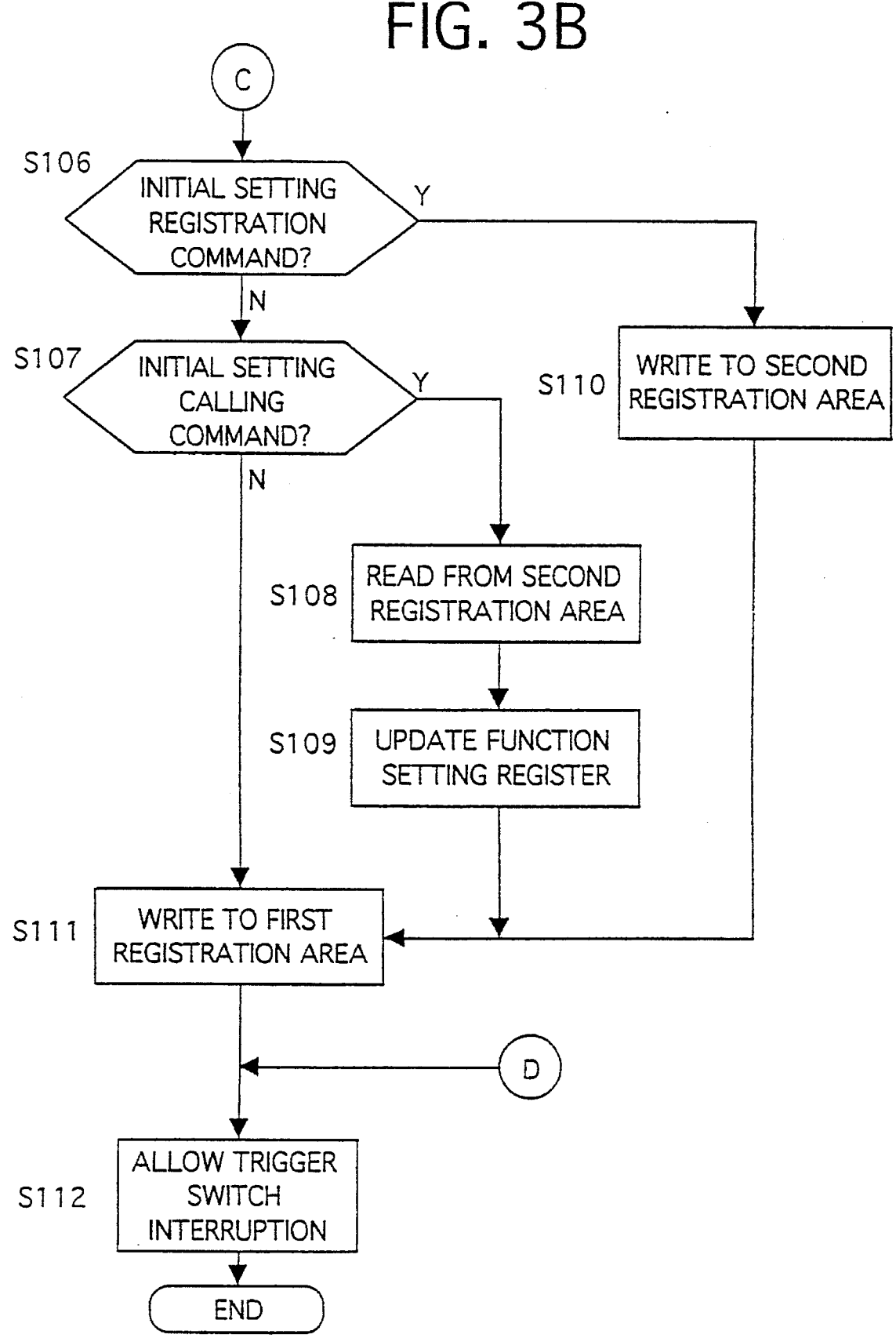
Figure 3C:
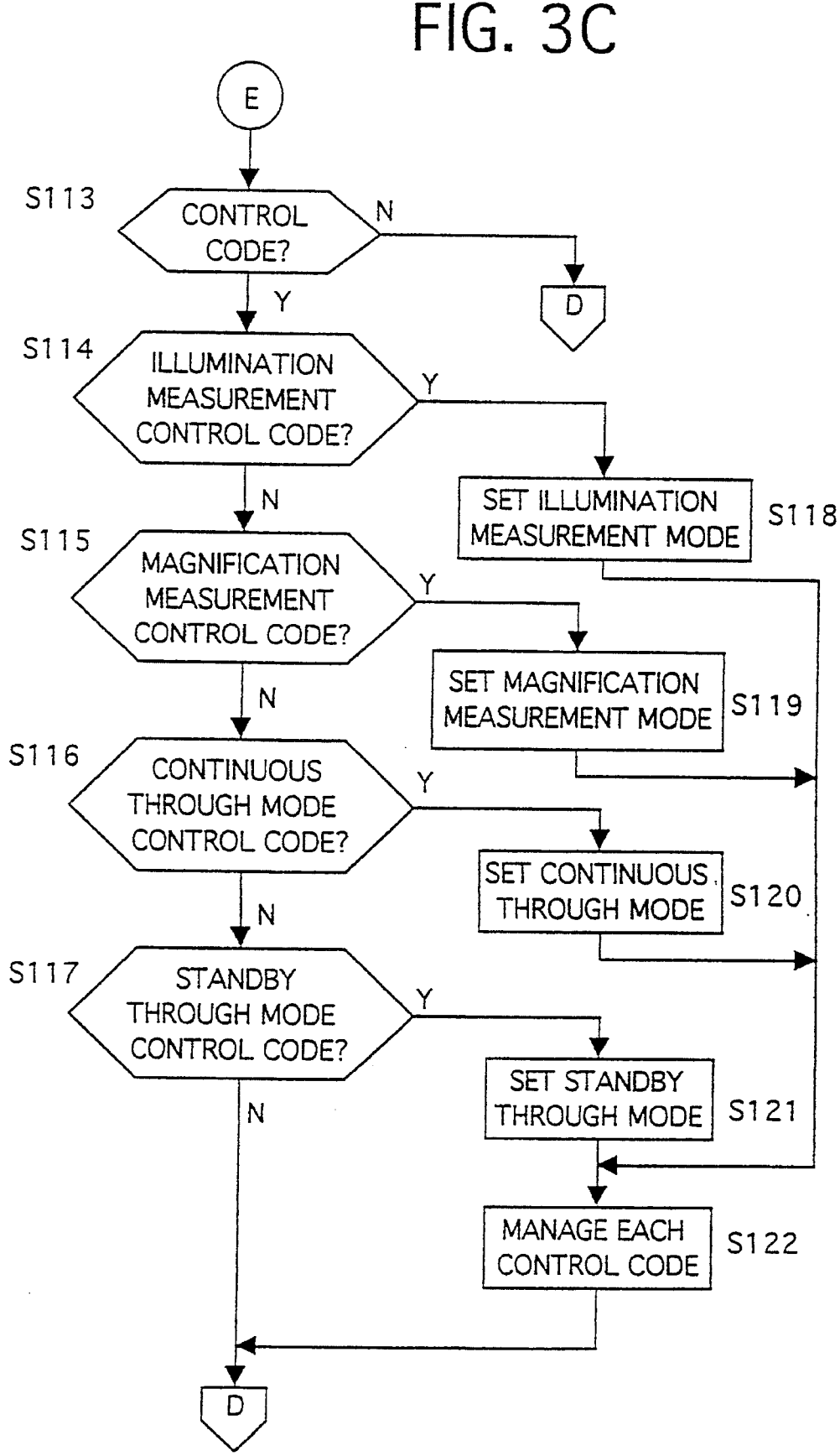

The communication interruption procedure which is used to receive the command and control codes, is shown in the flowchart of FIGS. 3A, 3B and 3C, and will be described in more detail below.

In the communication interruption procedure, the communication data is read in step S101. Step S102 determines whether the data is a function setting command code. If the data is not a function setting command code (S102 equal to N), control goes to step S113. Otherwise control proceeds to step S103 which determines whether the data is a CANCEL END command. If the data is the CANCEL END command, all the received codes are invalidated and control goes to step S112 where the trigger switch interruption is allowed.

If the command is not the CANCEL END command (S103 equal to N), then step S104 determines whether the code is an END command. If the command is not the END command (S104 equal to N) then control goes to step S101 and the transmitted data is read again. Otherwise, a function setting register 54 (see FIG. 11) of the CPU 15 is updated in step S105, and control proceeds to step S106.

Step S106 determines whether the code is an initial setting registration command. If the command is the initial setting registration command (S106 equal to Y), then a function setting value which has been stored in the function setting register 54 is written in the second registration area 52 of the non-volatile memory 14 in step S110 as an initial function setting value (i.e., an initial value of the function setting value).

If the command is not the initial setting registration command (S106 equal to N), then step S107 determines whether the command is an initial setting calling command. If the command is the initial setting call command (S107 equal to Y), the initial function setting value is read out of the second registration area 52 in step S108, and the function setting register 54 is updated in step S109. Then in the first registration area 51, the function setting value which has been written in the function setting register 54 is written as the function setting value in step S111.

If it is determined that the command is not the initial setting call command in step S107, the function setting value which has been stored in the function setting register 54 is written in the first registration area 51 as a function setting value in step S111.

After the step S111 is executed, the trigger switch interruption procedure is allowed in step S112.

If step S102 determines that the code is not the function setting command code, then control proceeds to step S113 which determines whether the data is a control code. If the data is not a control code then control goes to step S112, where the trigger switch interruption is allowed.

If the code is a control code (S113 equal to Y), then the type of control code is determined in steps S114 through S117. These control codes correspond to some of the modes of operation of the encoded symbol reader 1, described above.

Step S114 determines whether the received control code is an illumination measurement mode control code. If the control code is the illumination measurement mode control code (S114 equal to Y), then the mode is set to the illumination measurement mode in step S118.

If the control code it not the illumination measurement control code (S114 equal to N), then step S115 determines whether the control code is a magnification measurement mode control code. If the control code is the magnification measurement mode control code (S115 equal to Y), then the magnification measurement mode is set in step S119.

If the control code it not the magnification measurement mode control code (S115 equal to N), then step S116 determines whether the control code is a continuous through mode control code. If the control code is the continuous through mode control code (S116 equal to Y), then the continuous through mode is set in step S120.

If the control code it not the continuous through mode control code (S116 equal to N), then step S117 determines whether the control code is a standby through mode control code. If the control code is the standby through mode control code (S117 equal to Y), then the standby through mode is set in step S121.

If the control code is not the standby through mode control code (S117 equal to Y), then control goes to step S112 where the trigger switch interruption procedure is allowed.

After the steps S118, S119, S120 or S121 are executed, one of the illumination measurement mode procedure (see FIGS. 9A and 9B), the magnification measurement mode procedure (see FIG. 7), the continuous through mode procedure (see FIG. 4) or the standby through mode procedure (see FIG. 5), is executed in step S122, according to the mode set Control then proceeds to step S112 where the trigger switch interruption procedure is allowed to be executed. The trigger switch interruption procedure is executed when the trigger switch is turned on. Then, the communication interruption procedure is completed.

As described above, the encoded symbol reader 1 can update the initial function setting values, the function setting values, and reset the function setting values to the initial setting values. Further, more than one control code and/or command code can be downloaded to the encoded symbol reader 1. For instance, the illumination measurement mode and standby through mode control code can both be downloaded to the encoded symbol reader 1. Then, when a trigger interruption procedure (described below) occurs, procedures related to both control codes will be activated.

The various operation modes will be described below.

Figure 4:
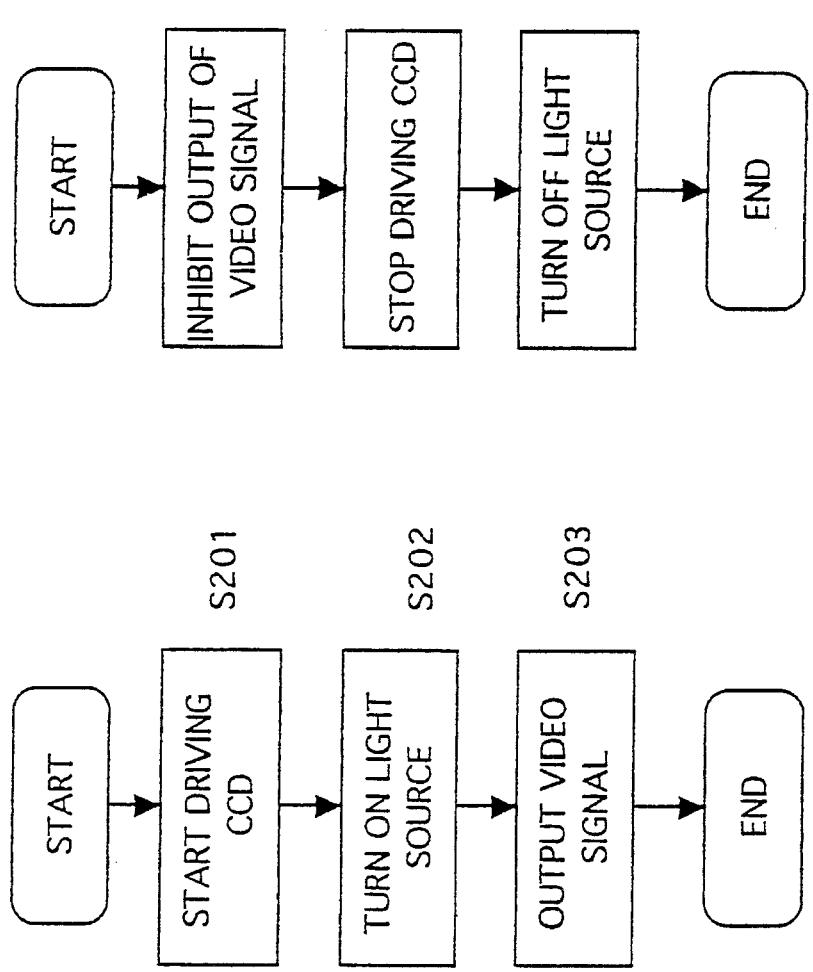
FIG. 4 shows a flowchart of a continuous through mode procedure.

FIG. 4 is a flowchart showing the continuous through mode procedure. When the continuous through mode control code is received the operation mode of the encoded symbol reader 1 is set such that the symbol reading area of the encoded symbol 35 is monitored through the monitor 31. Thus, in this mode, the image formed on the CCD 4 is directly displayed on the monitor 31.

In the continuous through mode, the CCD drive circuit 5 starts driving the CCD 4 in step S201. Then, in step S202, the light source driving circuit 9 turns on the light source 8. In step S203, the video signal is output, allowing an image of a reading area of the encoded symbol 35 that is being read (i.e., the image received by the CCD 4) to be displayed on the monitor 31. Thus, in this mode, the video signal corresponding to the image received by the CCD 4 is transmitted from the terminal 17 to the monitor 31, thereby monitoring the symbol reading area.

Figure 5:
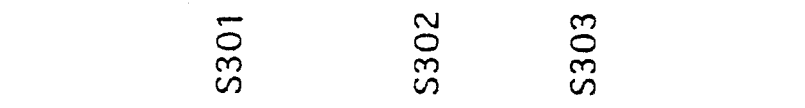
FIG. 5 shows a flowchart of a standby through mode procedure.

FIG. 5 is a flowchart illustrating a standby through mode procedure. This procedure is executed as soon as the encoded symbol reader receives the standby through mode control code. The standby through mode inhibits the transmission of the video signal corresponding to the image of the area of the encoded symbol 35 that is being read, to the monitor 31, except for a predetermined time period after decoding has been performed.

In step S301, the transmission of the video signal is inhibited and, therefore, the video signal is not transmitted to the monitor 31, and the symbol reading area cannot be monitored. This is achieved by having the CPU 15 transmit a mute signal to the encoder 16. When the mute signal is received, the encoder 16 outputs a monochrome image signal to the monitor 31, and thus a monochrome image is displayed on the monitor 31.

In step 302, the CCD drive circuit 5 stops driving the CCD 4. In step 303, the light source drive circuit 9 turns OFF the light source 8. Since the encoded symbol 35 is not read, it is not necessary to drive the CCD 4 and the light source 8. Therefore, power can be saved.

FIG. 6 shows a timing chart illustrating the operation of the continuous through mode procedure and the standby through mode procedure. If the continuous through mode control code is input, the continuous through mode is set, and the symbol reading area of the encoded symbol 35 is displayed on the monitor 31.

In the continuous through mode procedure, if the trigger switch is ON, the exposure control and decoding procedures are performed, and the decoded data is output. In this case, as shown in FIG. 6, since the light source 8, the CCD 4, and the video signal is always transmitted, a timer for the decoding procedure (described later) is not operated.

If the standby through mode control code is input, then the standby through mode procedure is executed and the transmission of the video signal is inhibited, except for a predetermined time after the decoding procedure.

In the standby through mode procedure, after the trigger switch interruption procedure has occurred (described later), the video signal can be transmitted to the monitor 31, and the exposure and decoding are executed. Then the decoded data is output. The interval between turning on the trigger switch and the outputting of the decoded data (or an error code) will be referred to as a main interval. After the decoded data has been output, the timer starts counting.

In the first registration area 51, the timer interval Ti is stored. Until the timer interval Ti elapses, (i.e., before the timer finishes counting), the transmission of the video signal remains enabled. After the timer interval Ti elapses, the transmission of the video signal, the light source 8, and the CCD 3 are turned OFF.

In the standby through mode, power is saved. Further, the timer interval Ti can be visually recognized. During the main interval, and the timer interval Ti, the transmission of the video signal is allowed. Therefore, if the trigger switch is turned ON during the timer period Ti, the light source 8, the CCD 4 and other circuits can be operated again without waiting for a warm-up period. Accordingly, a subsequent decoding procedure (reading operation) can be done promptly.

Figure 7:
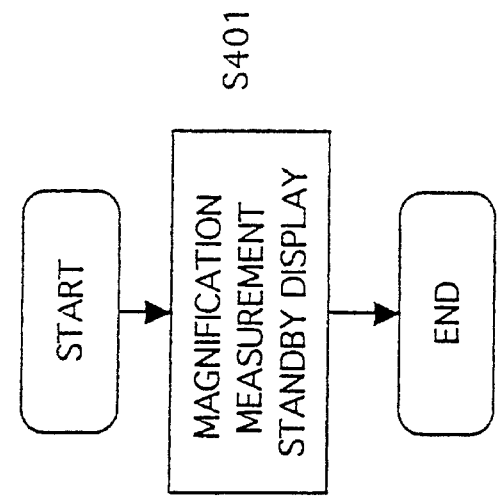
FIG. 7 shows a flowchart of a magnification measurement mode.

FIG. 7 is a flowchart illustrating the magnification measurement mode procedure.

The magnification measurement mode measures a magnification of the optical system 3. If the magnification measurement mode control code is input, the operation mode is set to the magnification measurement mode, and a magnification measurement mode procedure is executed.

In step S401 of the magnification measurement mode procedure (i.e., as soon as the encoded symbol reader receives the magnification measurement control code), a magnification measurement stand-by message indicating that the measurement of the optical system 3 can be executed, is indicated. The indication is made by continuously lighting the green LED of the display unit 21.

The measurement of the magnification of the optical system 3 in the magnification measurement mode will now be described.

Figure 8:
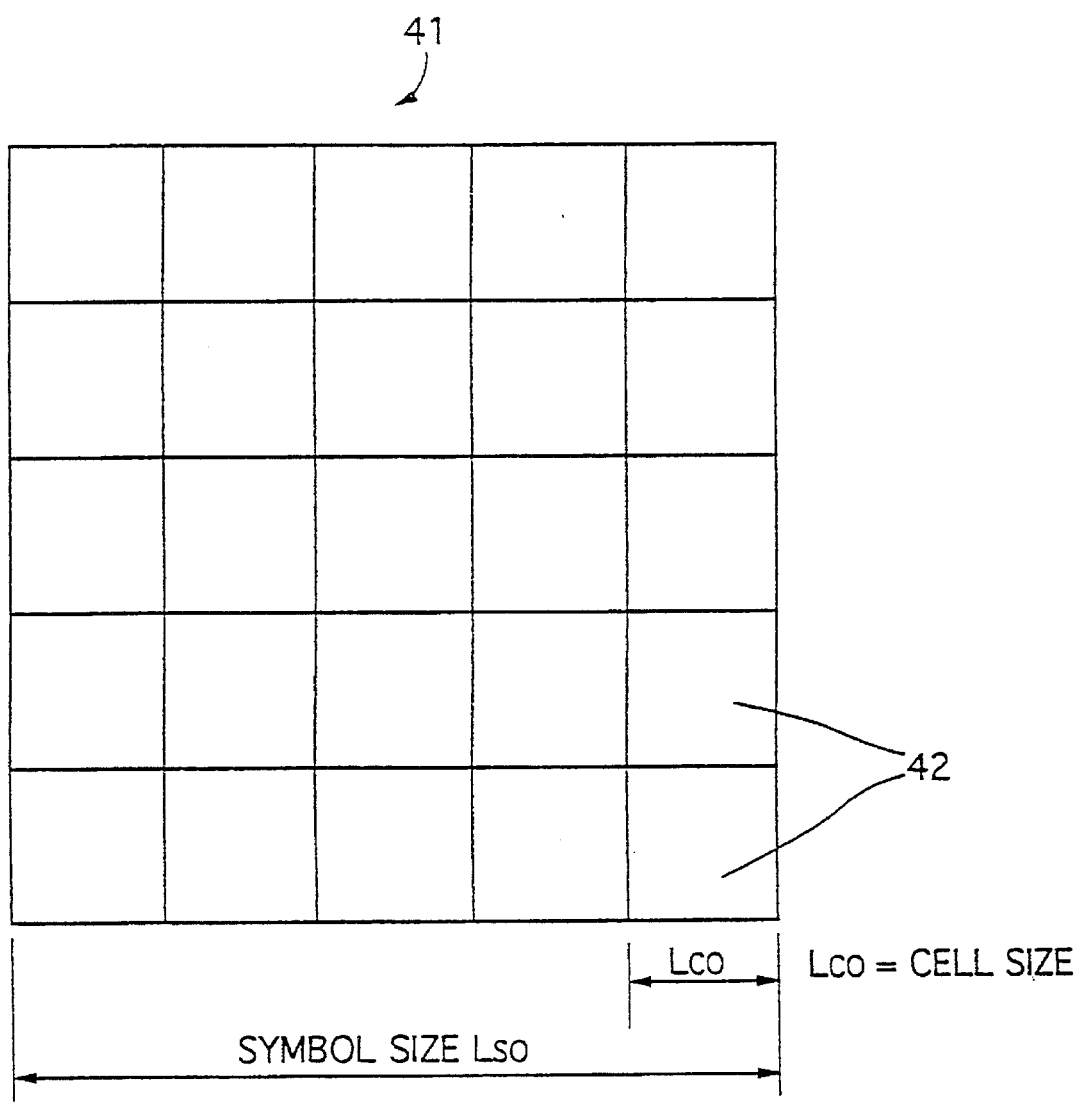
FIG. 8 shows an example of an encoded data symbol used for measuring the magnification of an optical system used in the encoded symbol reader shown in FIG. 1.

FIG. 8 shows an example of an encoded symbol for illustrating the measurement of the magnification of the optical system 3. In FIG. 8, the data symbol 41 consists of cells arranged in an n X n matrix.

As shown in FIG. 8, a length of a side of the data symbol 41 (i.e., the size of the data symbol 41) is Lso, and the length of a side of each cell 42 is Lco. Further, the number of cells 42 in the data symbol 41 is Nc, and the length of one side of the image of the encoded symbol formed on the CCD 4 is Ls. Other parameters include the magnification (M) of the optical system 3, the number of pixels (Nsp) of the CCD 4 corresponding to the symbol size and the length of a side of a pixel (Sp) of the CCD 4. The equations (1), (2) and (3) below give the relationships between the above parameters.

$$Lso = Lco \times Nc \quad (1);$$

$$Ls = Lso \times M \quad (2);$$

$$Ls = Nsp \times Sp \quad (3);$$

where the number of the pixels Nsp of the CCD 4 corresponding to the size of the encoded symbol 35 is the number of pixels of a side of the image formed on the CCD 4, and the pixels along a side of the CCD 4 are parallel to each other. The number Nsp is obtained by converting the X-Y coordinates representing a side of the image into the number of pixels.

From the equations (1), (2), and (3), the following equation is obtained:

$$M = \frac{N_{sp} \times S_p}{L_{co} \times N_c} \quad (4)$$

In equation (4), the pixel size Sp has been stored in the ROM of the CPU 15, and the number of the pixels Nsp corresponding to the symbol size of the CCD 4 is determined as described above. The size of the cell Lco, and the number of the cells Nc, are transmitted as a magnification measurement control code. Thus, by substituting these parameters in equation (4), the magnification of the optical system 3 can be obtained.

Even if the magnification M of the optical system is unknown (e.g., when the magnification of the optical system 3 is changed), an encoded symbol having a different number of cells Nc can be read (decoded) without detecting the size of the cells on the CCD 4.

Since the encoded symbol reader 1 is operable in the magnification measurement mode as described above, even if the size of the image of the encoded symbol is changed (e.g., the magnification of the optical system 3 is changed), with a simple operation (i.e., by inputting the cell size Lco and the number of the cells Nc), the magnification M of the optical system can be determined, and stored. Once the magnification M is stored, if either the cell size Lco or the number Nc of the cells is input, the other is automatically determined from equation (4). Thus, any encoded symbol can be read by inputting only one kind of data, which improves the operability of the device.

Generally, the cell size Lco is constant, and the number of the cells Nc is different. Thus, if the cell size Lco is stored, even if the number of cells Nc is changed, Nc can still be determined from equation (4) without being entered. Accordingly, an encoded symbol having a different number of cells can be easily read.

Figure 9A:
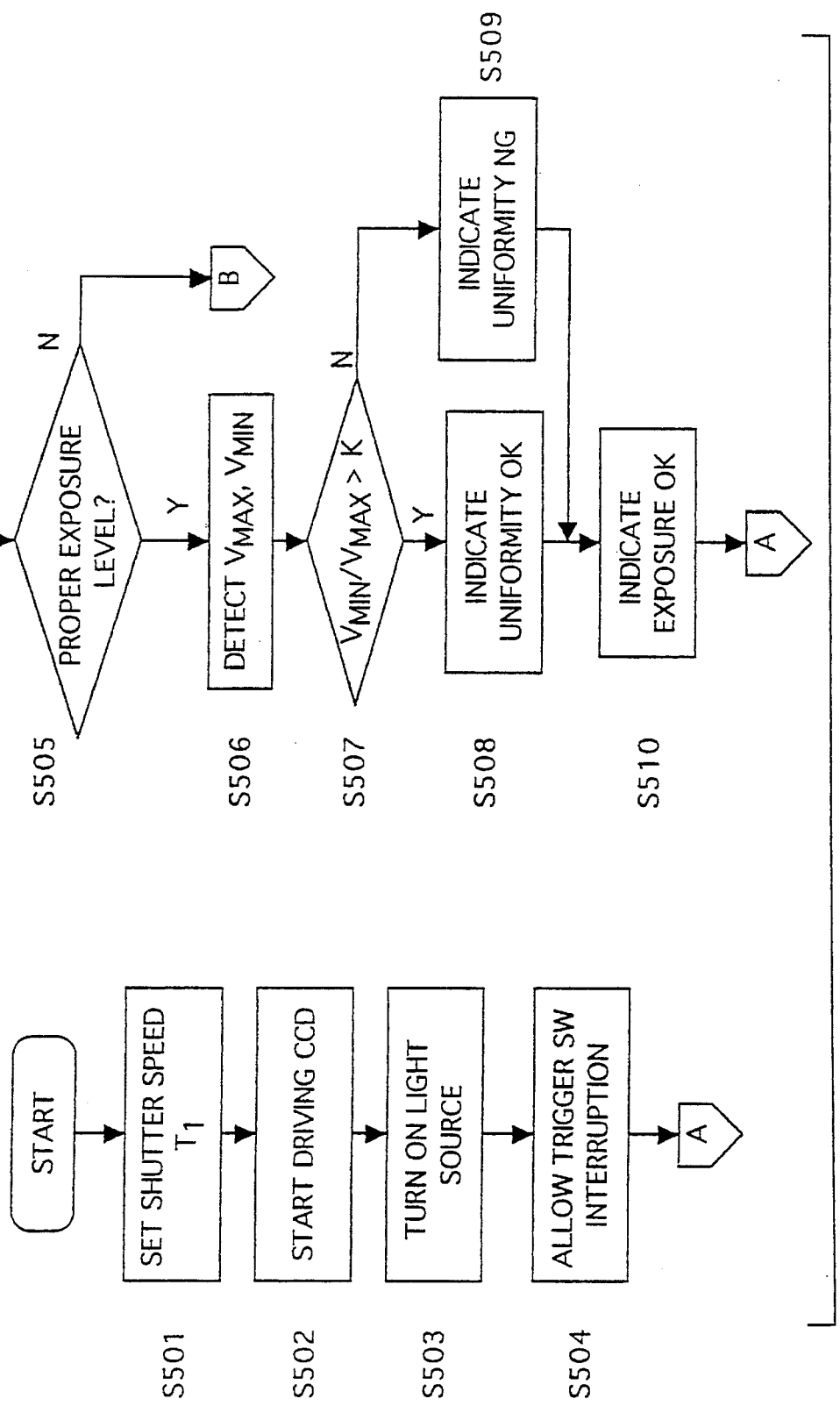

FIGS. 9A and 9B show a flowchart illustrating the illumination measurement mode procedure.

When the encoded symbol reader 1 receives the illumination measurement control code, the illumination measurement mode is started. In the illumination measurement mode, the distribution of the brightness of the background image of the symbol reading area is stored.

Step S501 of the illumination measurement mode procedure, sets the integration time (i.e., shutter speed) $T_1$ of the CCD 4. Then in step S502, the CCD drive circuit 5 starts driving the CCD 4. The light source 8 is turned ON by the light source driving circuit 9 in step S503. At step S504, an interruption of the trigger switch is allowed. Step S505 determines whether an exposure level is proper, using a method described below.

Figure 10:
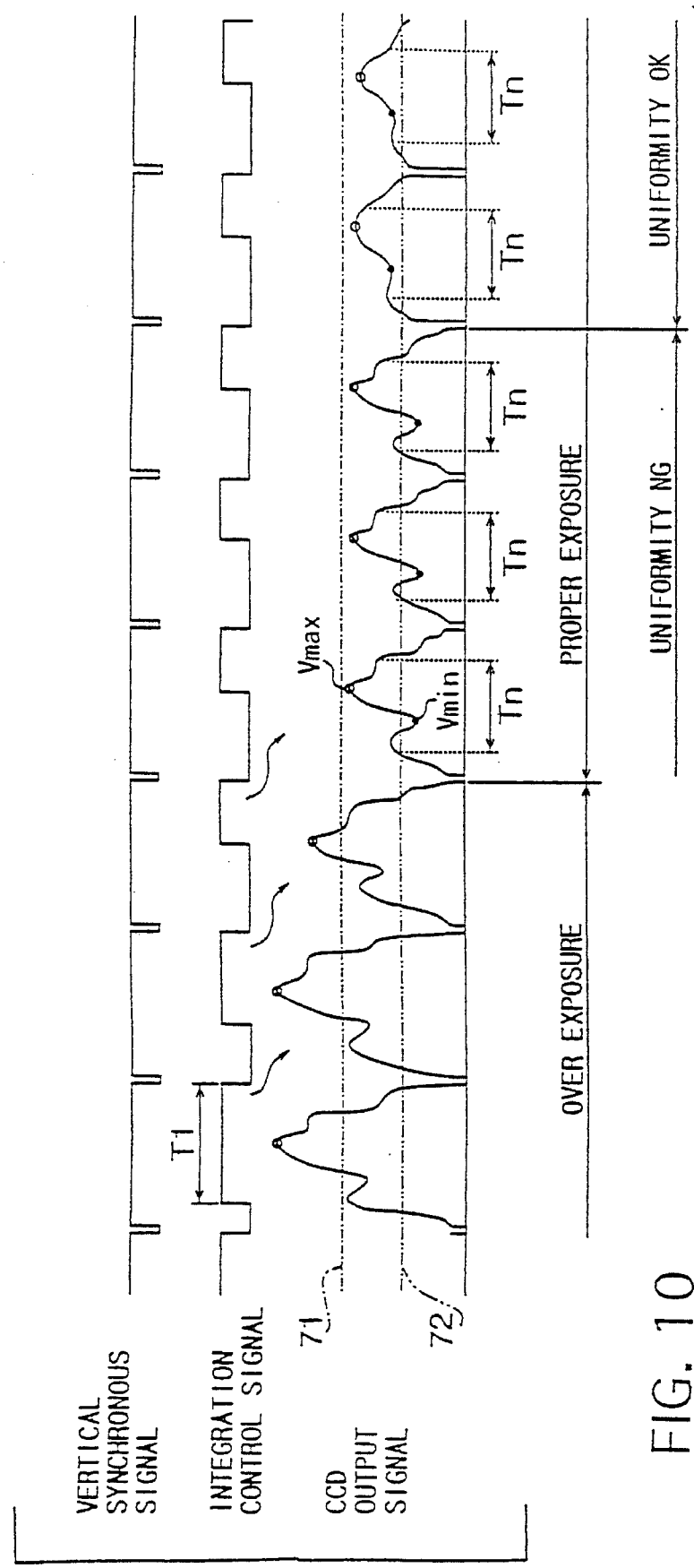
FIG. 10 shows a timing chart of the illumination measurement mode.

FIG. 10 is a timing chart when the illumination measurement mode is selected. As shown in FIG. 10, if the maximum output value of the CCD is between an upper threshold 71 and a lower threshold 72, the exposure is determined to be proper.

If the proper exposure level is achieved in step S505, the maximum value Vmax and the minimum value Vmin of the CCD output signal that occur within an examination period Tn, are determined in step S506. The examination period Tn is an interval of time between two successive pulses of the CCD output signal (i.e., the time interval between a falling edge of a pulse and a rising edge of a subsequent pulse).

By comparing Vmax and Vmin, the uniformity of the brightness distribution can be determined. The uniformity of brightness is determined if the equation (7) below is satisfied:

$$Vmin/Vmax > K \quad (7);$$

where, K is a constant which is stored in memory.

Step S507 determines whether Vmin/Vmax>K. If this equation is satisfied (S507 equal to Y), the image has uniform brightness and control goes to step S508 where the display unit 21 indicates that there is uniform brightness. If the condition is not satisfied (S507 equal to N), the image does not have uniform brightness and control goes to step S509 where the display unit 21 indicates that the uniformity is no good (NG).

Then at step S510, the display unit 21 indicates that the exposure is proper. In this embodiment, uniform brightness is indicated by turning OFF the red LED of the display unit 21. Further, when the encoded symbol reader 1 is ready to make an exposure, the green LED of the display unit 21 is turned ON.

If Vmin/Vmax≦K (i.e., N in S507), a NG condition of the uniformity of the brightness and a proper exposure are indicated by turning OFF the red LED of the indicating unit 21, and by blinking the green LED.

After step S510 is executed, control goes back to step S505.

If it is determined in step S505 that the exposure is not proper, then step S511 determines whether the image is overexposed.

If the maximum value of the output signal of the CCD exceeds the upper threshold value 71, then the image is over exposed. Conversely, if the maximum value is less than the lower threshold value 72, then the image is under exposed. If the image is over exposed in step S511, an integration interval $T_1$ of the CCD 4 is shortened in step S512 such that:

$$T_1 = T_1/\Delta T;$$

where ΔT>1.

At step S513 it is determined whether $T_1 < T_S$, where $T_S$ is a lower limit of the integration period of CCD 4. If $T_1 \geq T_S$ in step S513, then control goes back to step S505.

If $T_1 < T_S$, $T_1$ is set to $T_S$ in step S514.

In step S515, an exposure NG condition is indicated, and then control goes back to step S505. Exposure NG is indicated by turning OFF the green LED and blinking the red LED of the display unit 21.

If at step S511 it is determined that the image is under exposed, then the integration interval $T_1$ is lengthened as follows:

$$T_1 = T_1 \times \Delta T;$$

where, ΔT>1.

Then at step S517 it is determined whether $T_1 > T_L$. $T_L$ is an upper limit of the integration interval of the CCD 4. If $T_1 \leq T_L$ in step S517, control returns S505. If it is determined that $T_1 > T_L$, $T_1$ is set to $T_L$ in step S518 and control returns step S515, where the exposure NG condition is indicated. Then control proceeds to step S505.

In the illumination measurement mode, automatic exposure control is performed. As shown in FIG. 10, if over exposure occurs, $T_1$ is shortened by dividing $T_1$ by $\Delta T$ such that $T_1 \geq T_S$ is always satisfied. The maximum value of the output signal of the CCD gradually decreases, and when the output signal becomes lower than the upper threshold value 71, a proper exposure is achieved. When the proper exposure is achieved, the integration interval $T_1$ is kept constant.

If under exposure occurs (not shown in FIG. 10), then $T_1$ is lengthened within the range $T_1 \leq T_L$, by multiplying by $\Delta T$. When the output signal exceeds the lower threshold value 72, the proper exposure is achieved.

The encoded symbol reader 1 of the embodiment has the illumination measurement mode as described above. Further, as described above, a proper exposure level (or exposure NG) and uniformity of brightness can be individually indicated.

Further, if the proper exposure level is not achieved, by changing the background pattern of the data symbol or the light source 33, a proper exposure level can be obtained. When the proper exposure level is achieved, the data symbol can be read. Further, illumination compensation values Eij and threshold values Sij for a comparison procedure can be easily obtained.

The methods of determining whether the exposure is proper and the methods of determining the uniformity of the brightness of the optical image are not limited to those described above. The exposure level can be determined based on whether an average value, center-weighted value, or a minimum value during a certain time interval of exposure is within a predetermined range. The uniformity can be determined in accordance with the ratios Vmin/Vav, or Vmax/Vav, where Vav is an average value.

As described above, when the illumination measurement mode control code is first received, the above steps are carried out until the trigger interrupt is received. The procedure performed after the trigger interruption has occurred will be described later.

The automatic threshold mode is set with a command code.

In the automatic threshold mode, during every reading operation of a data symbol, a threshold value Sij is obtained based on the CCD image data of the first exposure. The digital image signal obtained when the main exposure is executed is then compared with the threshold value Sij. The threshold value Sij is a value between adjacent maximum and minimum values of the CCD image data.

In the automatic threshold mode, the threshold values Sij are obtained based on the distribution of the optical image when the encoded symbol 35 is read. Binary data is then generated by using the threshold values Sij, and therefore the encoded symbol 35 can be read accurately.

If the mode is not the automatic threshold mode (but a simplified threshold mode), the threshold value Sij is calculated based on the compensation values Eij which have been stored in the non-volatile memory 14. This procedure is faster than the automatic threshold mode.

The decoding procedure will be described below with reference to FIGS. 12A and 12B. The decoding procedure includes noise filtering, sub-sampling, symbol edge detection and data decoding.

Initially, primary image data (i.e., binary data) corresponding to an obtained image is compressed by applying the noise filtering operation, and sub-sampling operation to produce secondary image data (sub-sampling data). Then, the symbol edge detection is performed using the secondary image data. The secondary image data is only used for the symbol edge detection operation. The decoding of the data symbol is performed using the primary image data corresponding to a portion of the image located within an area inside the edge of the encoded symbol, as determined by the symbol edge detection operation.

The primary image data and the secondary image data are stored in different areas of the main memory 13.

Figure 12A:
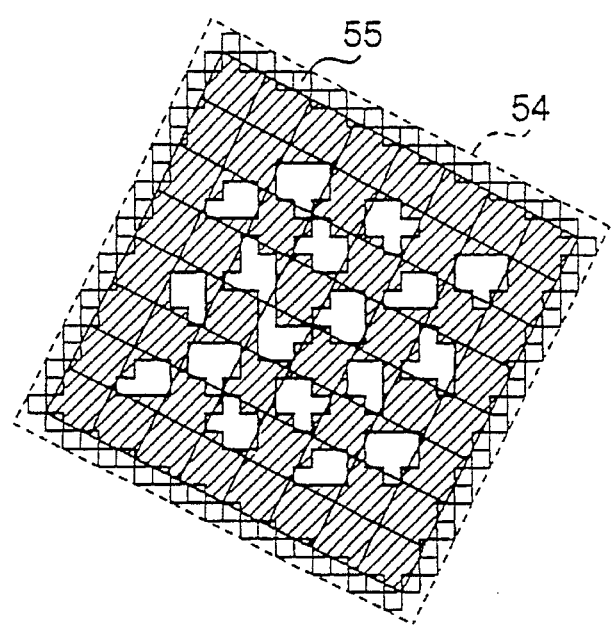
FIGS. 12A and 12B show examples of pre-sampled and post-sampled images of an encoded symbol.
Figure 12B:
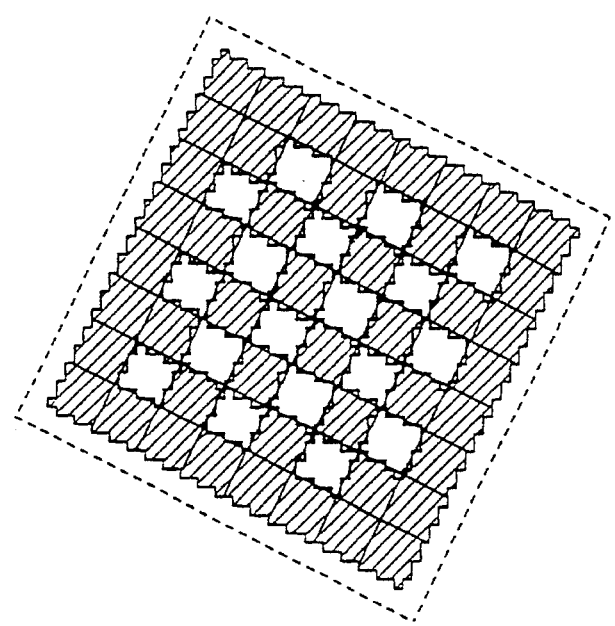

FIGS. 12A and 12B show examples of the secondary image (post-sampling image), and the primary image (pre-sampling image), respectively.

As shown in FIGS. 12A and 12B, noise filtering and sub-sampling operations are executed for a unit of four pixels (2×2 pixels). The sub-sampling operation is executed such that the pixel units do not overlap. Thus, if a unit of four pixels is processed (noise filtering is applied), and then an adjacent unit of four pixels is processed.

If at least two of the four pixels in the primary image are 'black', then all four pixels are set to 'black'. Otherwise all four pixels are set to 'white'. This process is applied to every unit of pixels. Further, each unit of pixels is represented by one bit, thereby producing the secondary image data, which has less data than the primary image data.

As shown in FIG. 12B, in the symbol edge detection operation, an envelope 54 of white pixels 55 adjacent to the black pixels at the peripheral portions of the secondary image is detected. Therefore, by executing the noise filtering and sub-sampling operations, the secondary image data which has less information than the primary image data, is obtained. Further, the noise in the data is reduced. This allows the symbol edge detection to be performed at high speed, thereby improving the overall efficiency of the encoded symbol reader 1. For the quick detection of the symbol edge, it is preferable that the encoded symbol has a pattern which clearly indicates adjacent sides of the frame of the encoded symbol.

After the edge of the encoded symbol 35 has been detected, the decoding of the primary image data contained within the edges of the encoded symbol 35, can be performed. In the decoding procedure, an image reversal mode (described below) is turned ON/OFF. If the image reversal mode is turned ON, the order of reading the primary data corresponding to the units of pixels of the encoded symbol 35 is reversed (described below). If the image reversal mode is turned OFF, the reading order is unchanged.

The noise filtering, sub-sampling, and symbol edge detection operations are not limited to those described above. Alternatively, the analog signal output by the CCD 4 can be filtered with a low pass filter, and then converted into a digital signal. The digital image signal is then compressed and stored in the main memory 13 at a predetermined address. The stored data can then be used as the secondary image data.

Further, the output signal of the CCD 4 can be converted into the digital signal without filtering, and stored in the main memory 13 in order to obtain the primary image data.

The image reversal mode will be described below with reference to FIGS. 13, 14 and 15.

Figure 13:
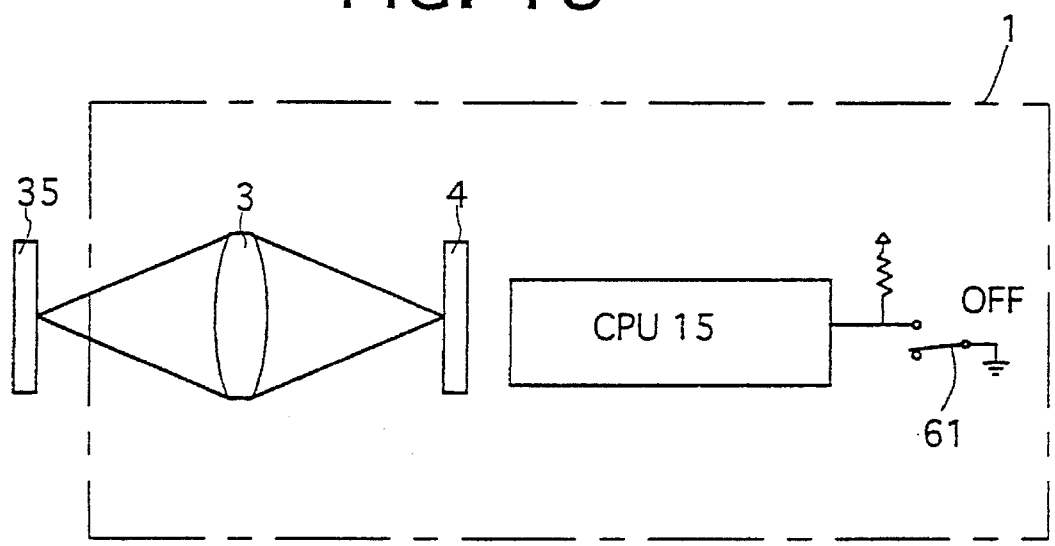
FIG. 13 shows a normal optical system which may be used in the encoded symbol reader shown in FIG. 1.
Figure 14:
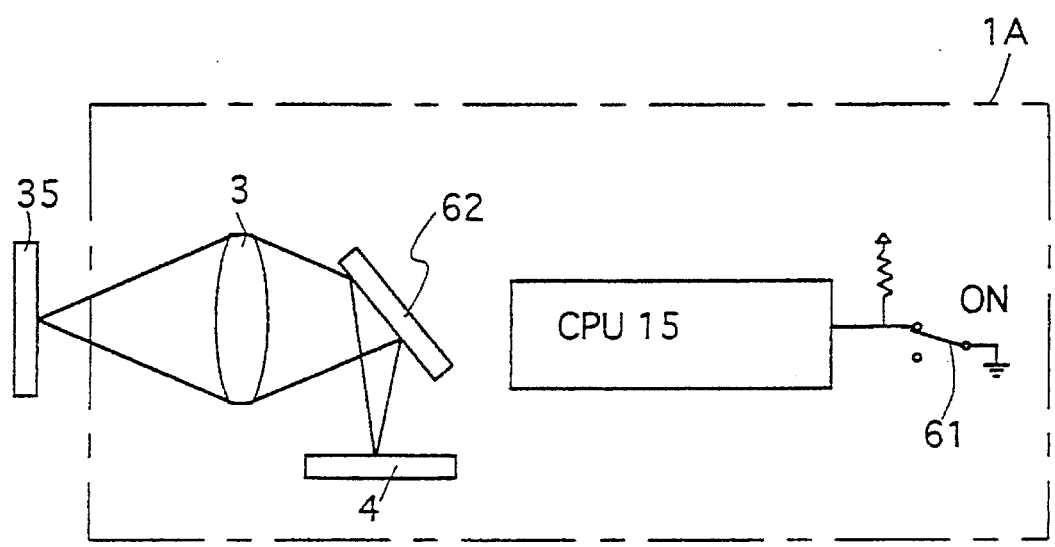
FIG. 14 shows an inverted optical system which may be used in the encoded symbol reader shown in FIG. 1.

FIG. 13 shows the encoded symbol reader 1 having a normal optical system while FIG. 14 shows a modified encoded symbol reader 1A which has an image reversing optical system.

As shown in FIGS. 13 and 14, the encoded symbol readers 1 and 1A have an image inversion detection switch 61 for detecting whether the optical system 3 is an image reversing optical system. If the optical system 3 is an image reversing optical system, the optical system 3 has a mirror 62. The mirror 62 is used to form an inverse image of the encoded symbol 35 on the CCD 4.

As shown in FIG. 13, if the optical system 3 does not reverse the image, then the image inversion detection switch 61 is set to an OFF position. However, if the optical system does reverse the image, as shown in FIG. 14, then the image inversion detection switch 61 is turned ON. Alternatively, if the reversed image is formed on the CCD 4, by turning OFF the image inversion detection switch 61, and transmitting the reverse picture command code from the computer 32 to the CPU 15, a normally oriented can be formed.

Figure 15:
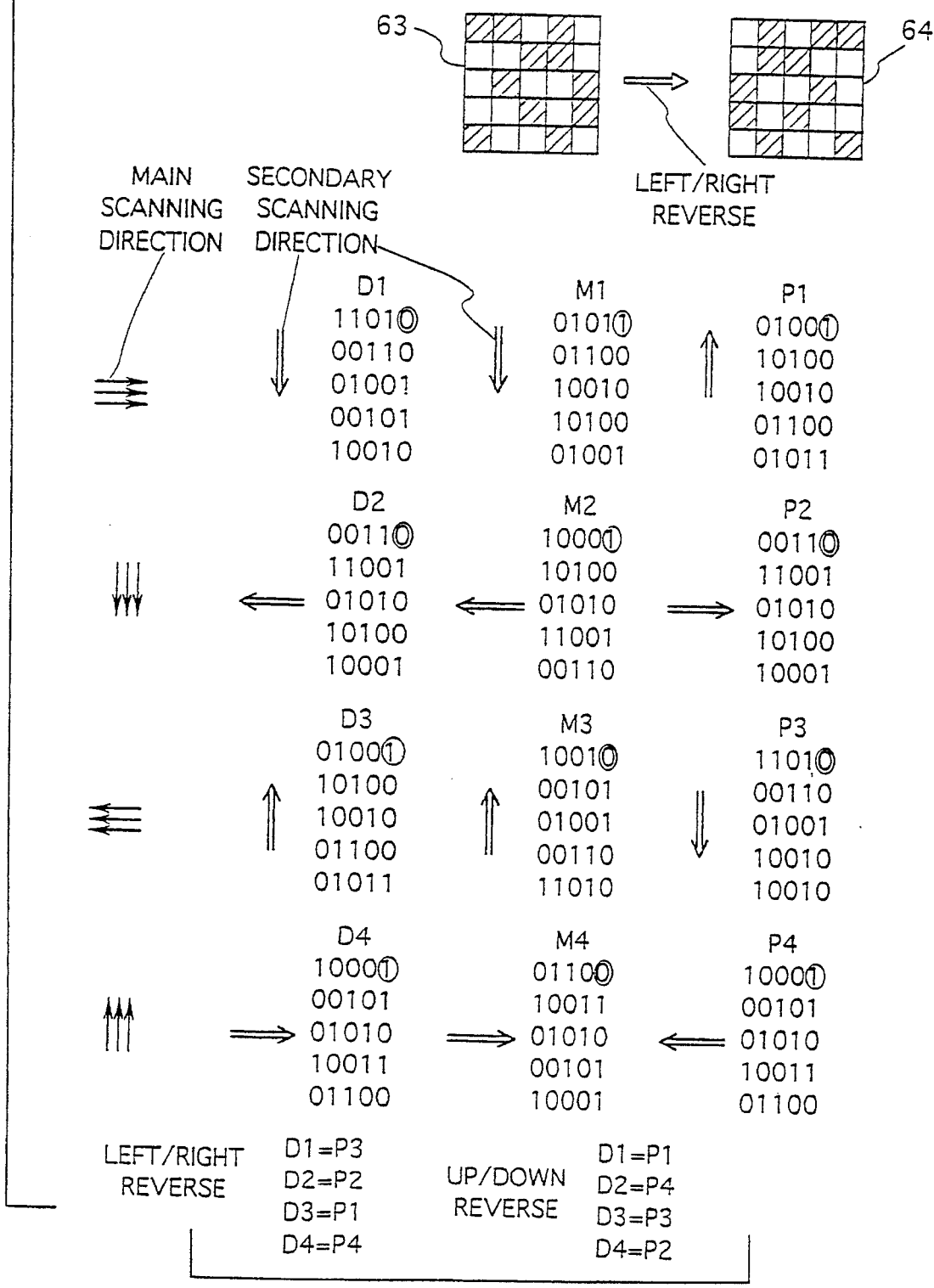

FIG. 15 is a chart showing a decoding procedure when the image reversal mode is ON. As shown in FIG. 15, if the encoded symbol 35 is read normally, a correctly oriented image 63 would be obtained. If the encoded symbol 35 or the optical system 3 is left/right reversed (as shown in the FIG. 15) and the reversed encoded symbol 35 is read normally, a reversed image 64 can be obtained.

If the correct image 63 is read from the memory in accordance with the sampling order (main scanning and secondary scanning) as indicated in the figure, cell data D1, D2, D3 and D4 are obtained. More specifically, the sampling order is defined with the main scanning direction and the auxiliary scanning direction. The image 63 is read four times by changing the main scanning direction such that the directions are parallel to sides of the symbol edge which has been detected with use of the secondary image, and that the auxiliary scanning direction is changed in accordance with the changed direction of the mainscanning direction. The relationship of the auxiliary scanning direction relative to the main scanning direction for each sampling is unchanged. A main scanning direction for each sampling of the four sides of the image 63 is sequentially selected clockwise as indicated by an arrow in FIG. 15. Further, since the size of each cell is known, when the image data is read from the memory, sampling of the data is performed such that one bit of data is output for each cell. In other words, by knowing the cell size, one-bit data is generated to represent each cell. Therefore, the amount of data read out of the memory becomes much less than the amount of data stored in the memory.

If the reversed image 64 is read from the memory in accordance with the same sampling order as above, cell data M1, M2, M3 and M4 are obtained. As shown in FIG. 15, the data D1 through D4 are different from the data M1 through M4.

In this embodiment, if a reversed image is to be processed (as a result of turning on the image inversion detection switch 61), the encoded symbol is read in the normal scanning direction (i.e., as if the image was not reversed) and the image data is stored in memory. Then, by reversing the reading order of the stored image data, the cell data P1, P2, P3 and P4 are obtained using the scanning directions shown in FIG. 15. When P1 through P4 are to be obtained, the main scanning direction is the same as that for obtaining cell data D1 through D4, however the secondary scanning direction is reversed.

If the encoded symbol 35 is left/right reversed, then each of the cell data P1 through P4 corresponds to one of the cell data D1 through D4 (i.e., D1=P3, D2=P2, D3=P1 and D4=P4).

If the encoded symbol 35 or the optical system 3 is reversed such that an upside down image (not shown) is produced, then with the same sampling order, each of the cell data P1 through P4 corresponds to the cell data D1 through D4 (i.e., D1=P1, D2=P4, D3=P3 and D4=P2).

As described above, one of the cell data P1 through P4 is correct. The identification of the correct cell data is determined based on a parity bit. For example, if the right-most bit on the first line of the data area is used as the parity bit (circled in FIG. 15), then the parity bit is "0" if the number of "1"s in the four cells of the first line is odd, and the parity bit is "1" if the number of "1"s of the four cells of the first line is even. Accordingly, the data P3 is determined to be correct.

Even if the image reversal mode is OFF, the cell data is determined to be correct by checking the parity bit, as described above. However, the determination of the correct data is not limited to the parity bit method described above, but any method is applicable. For example, predetermined data can be inserted at a predetermined position (such as a corner), and the correct data can be selected by detecting the predetermined data located at the predetermined position.

Figure 16:
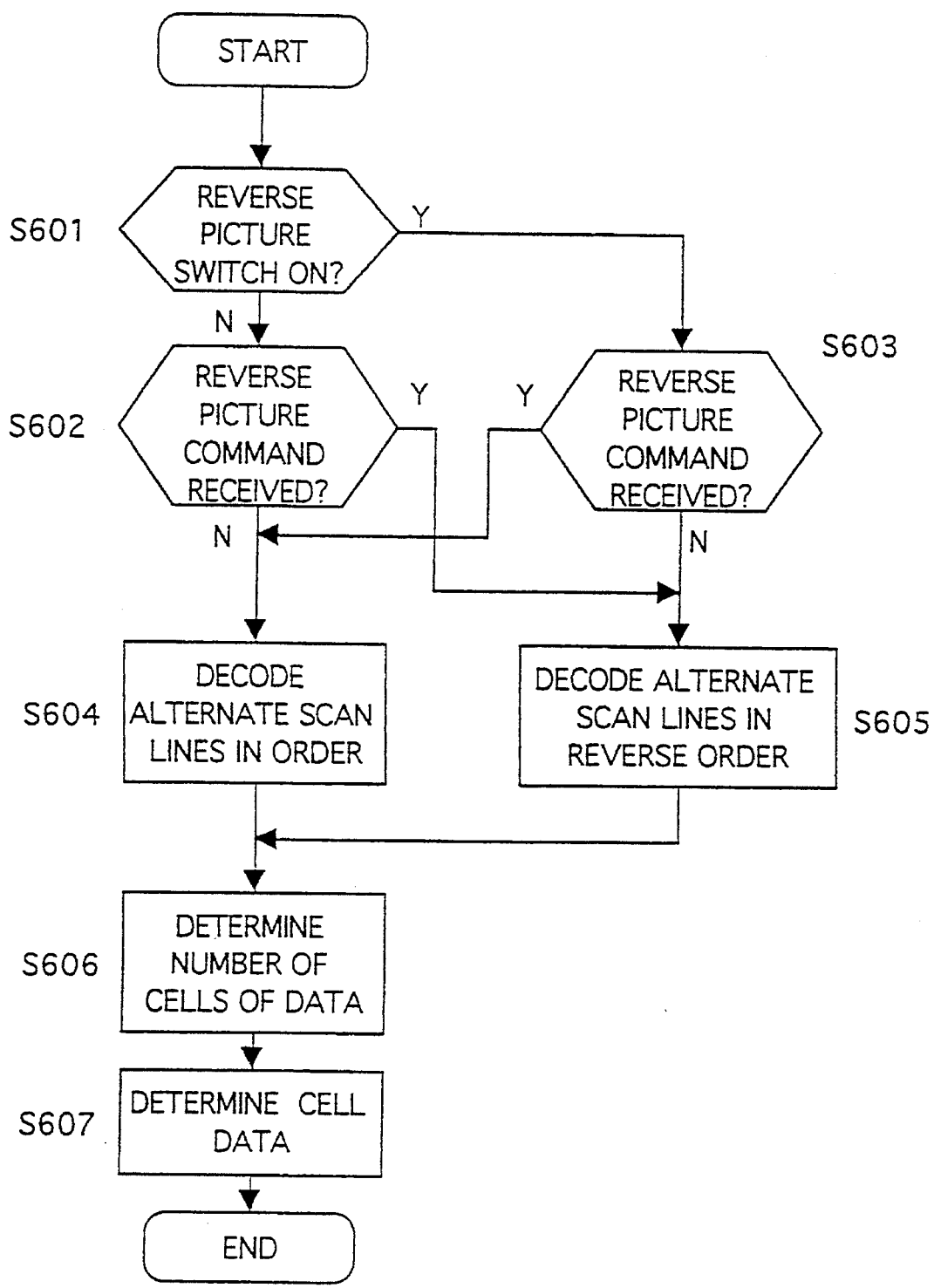
FIG. 16 is a flowchart of the decoding procedure shown in FIG. 15.
Figure 17A:
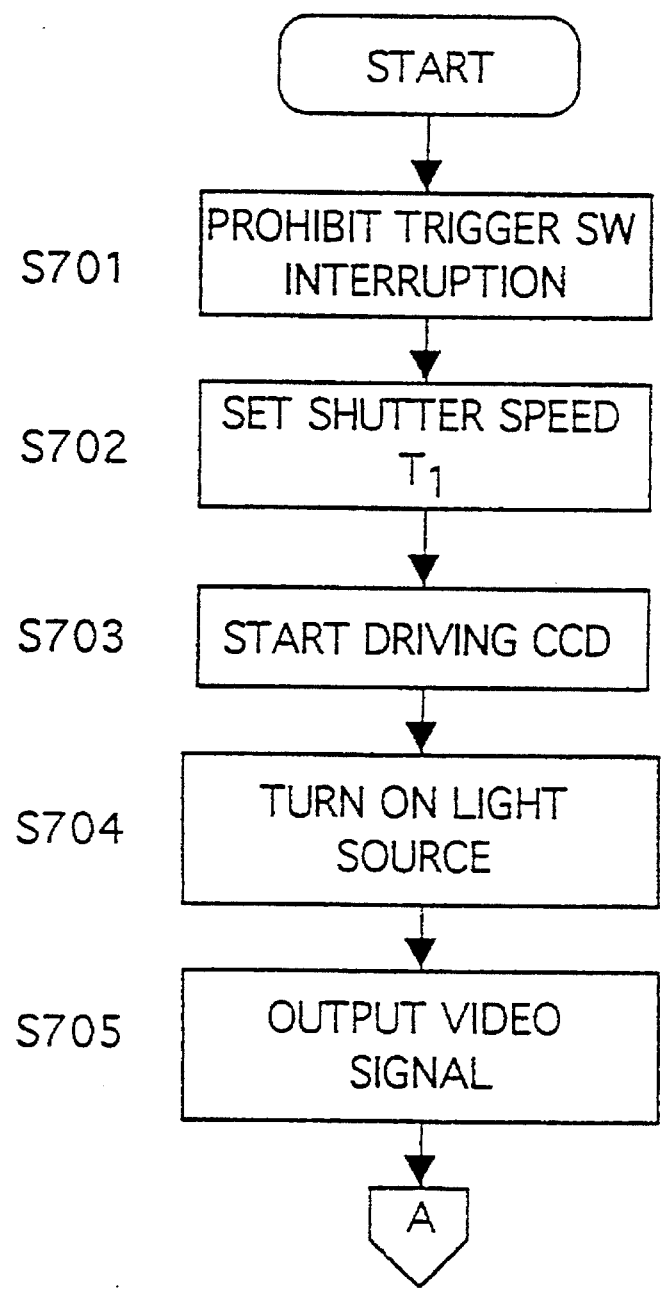
FIGS. 17A, 17B, 18A, 18B, 19A and 19B show a flowchart of a trigger switch interruption procedure.
Figure 17B:
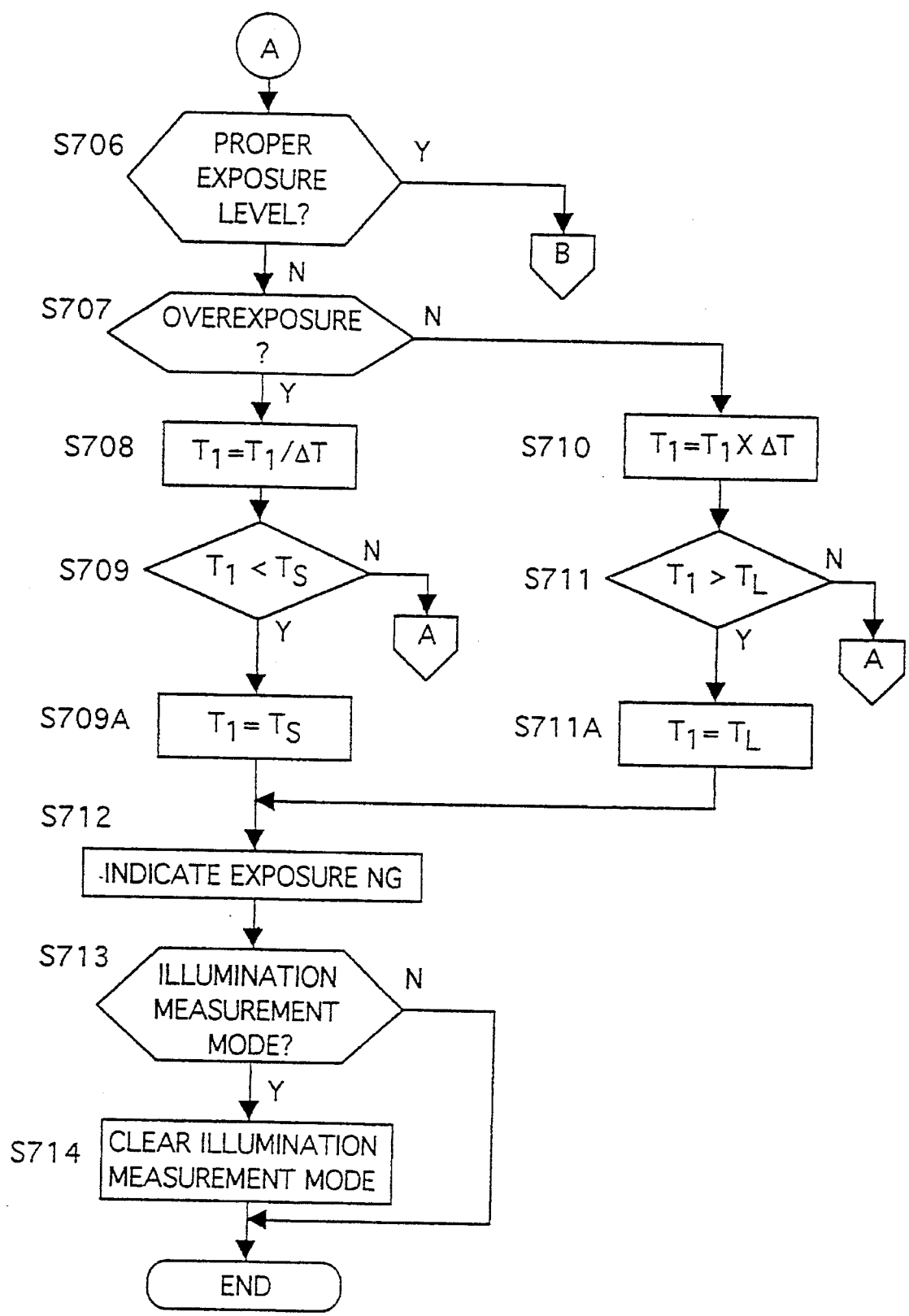
Figure 18A:
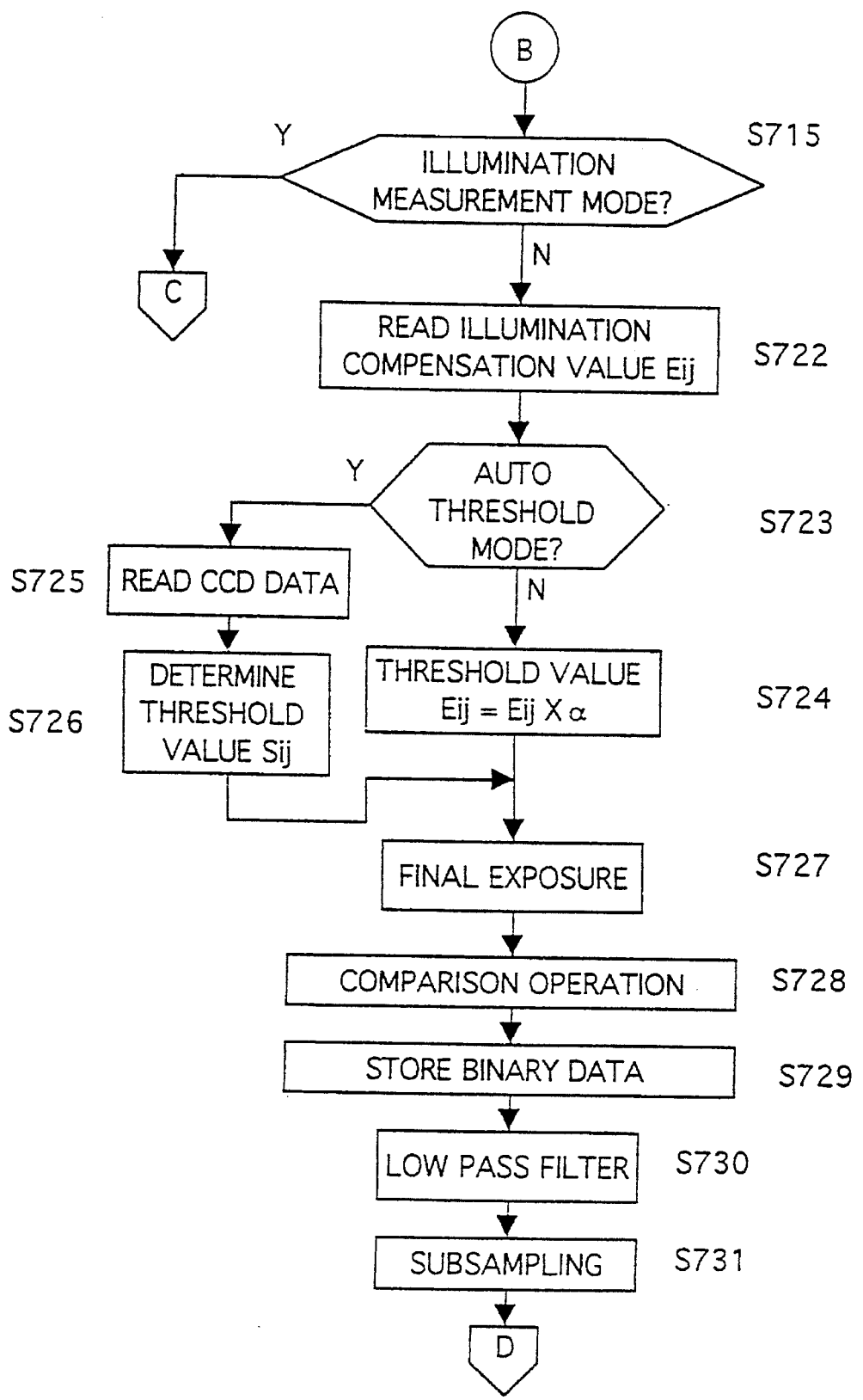
Figure 18B:
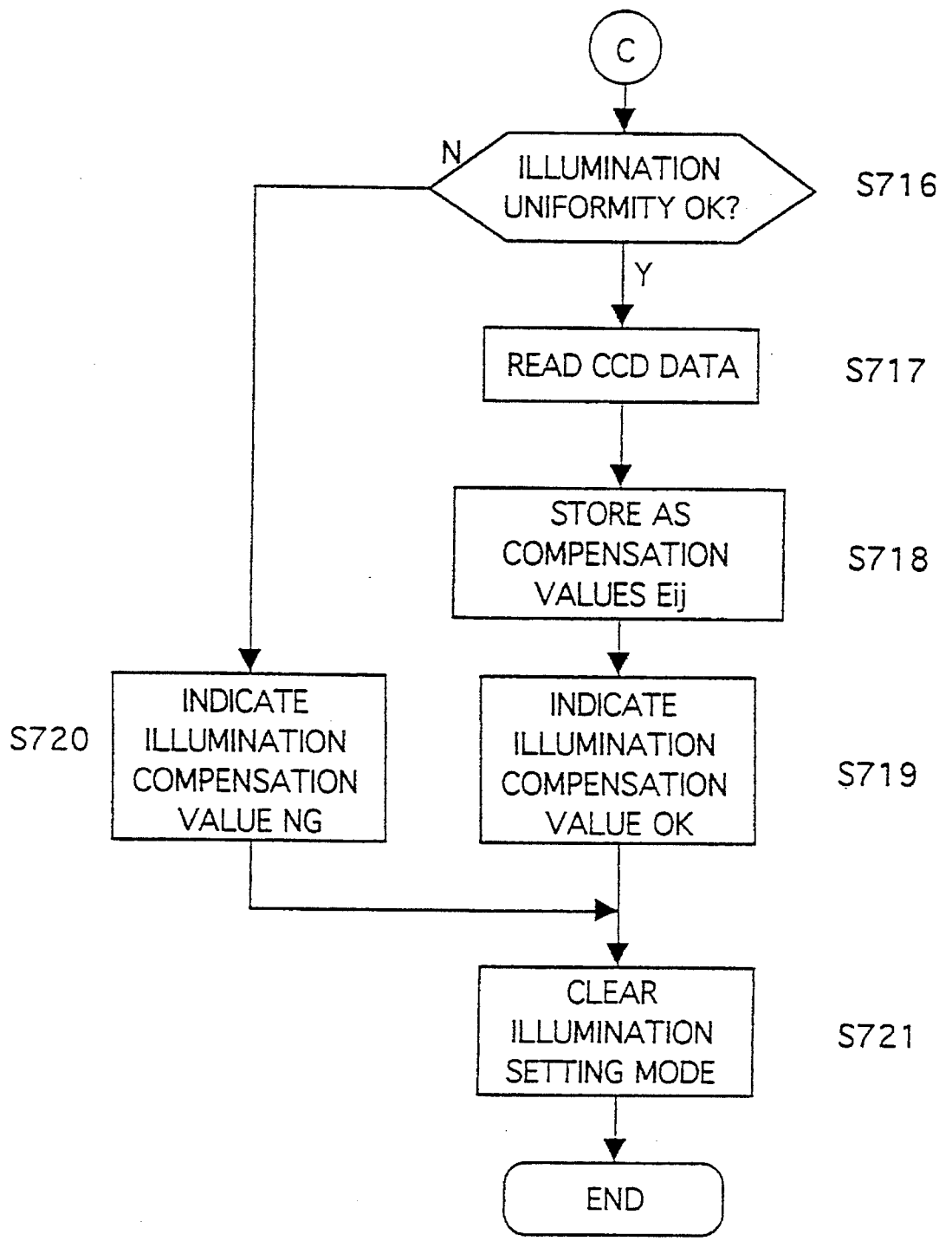
Figure 19A:
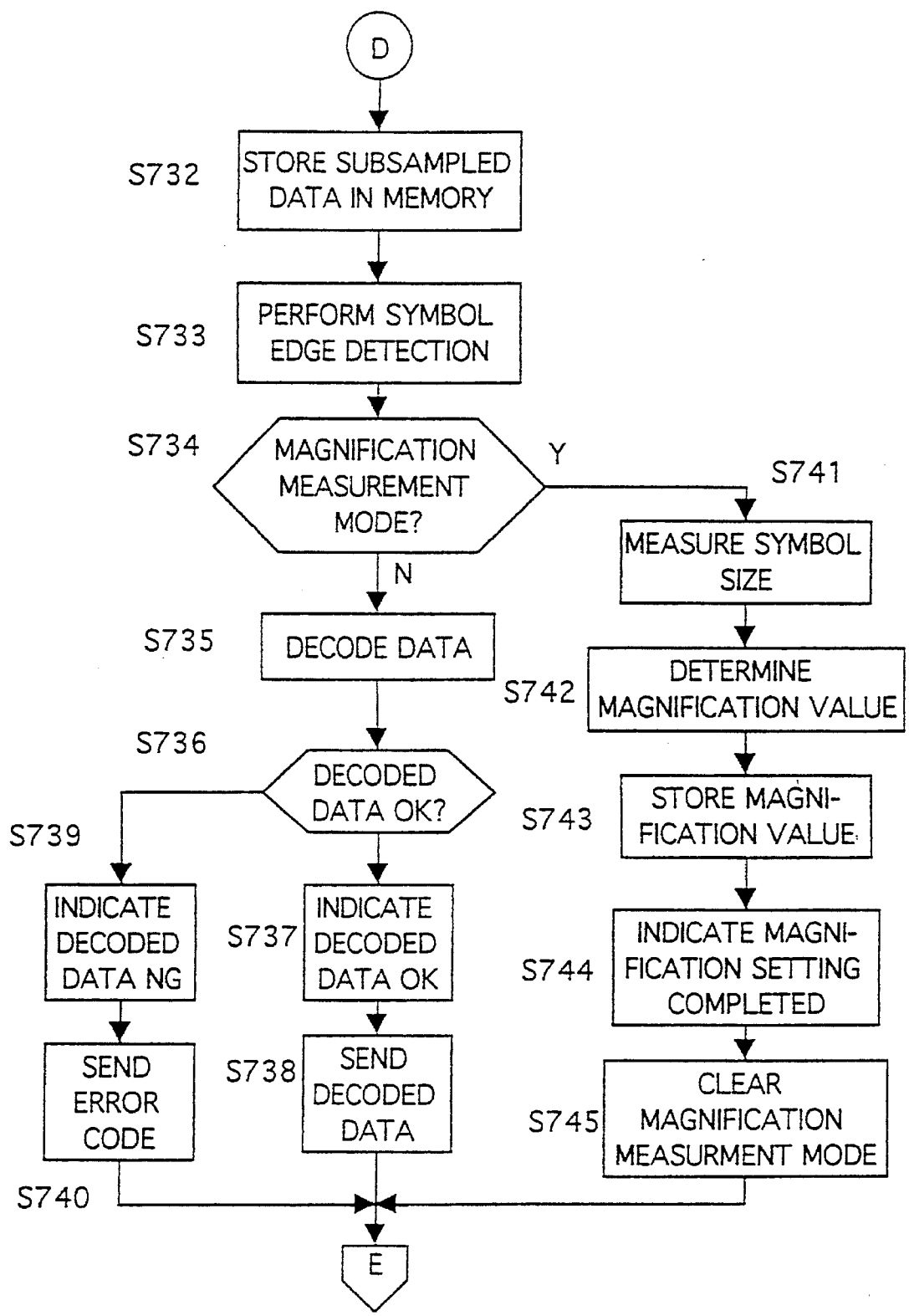
Figure 19B:
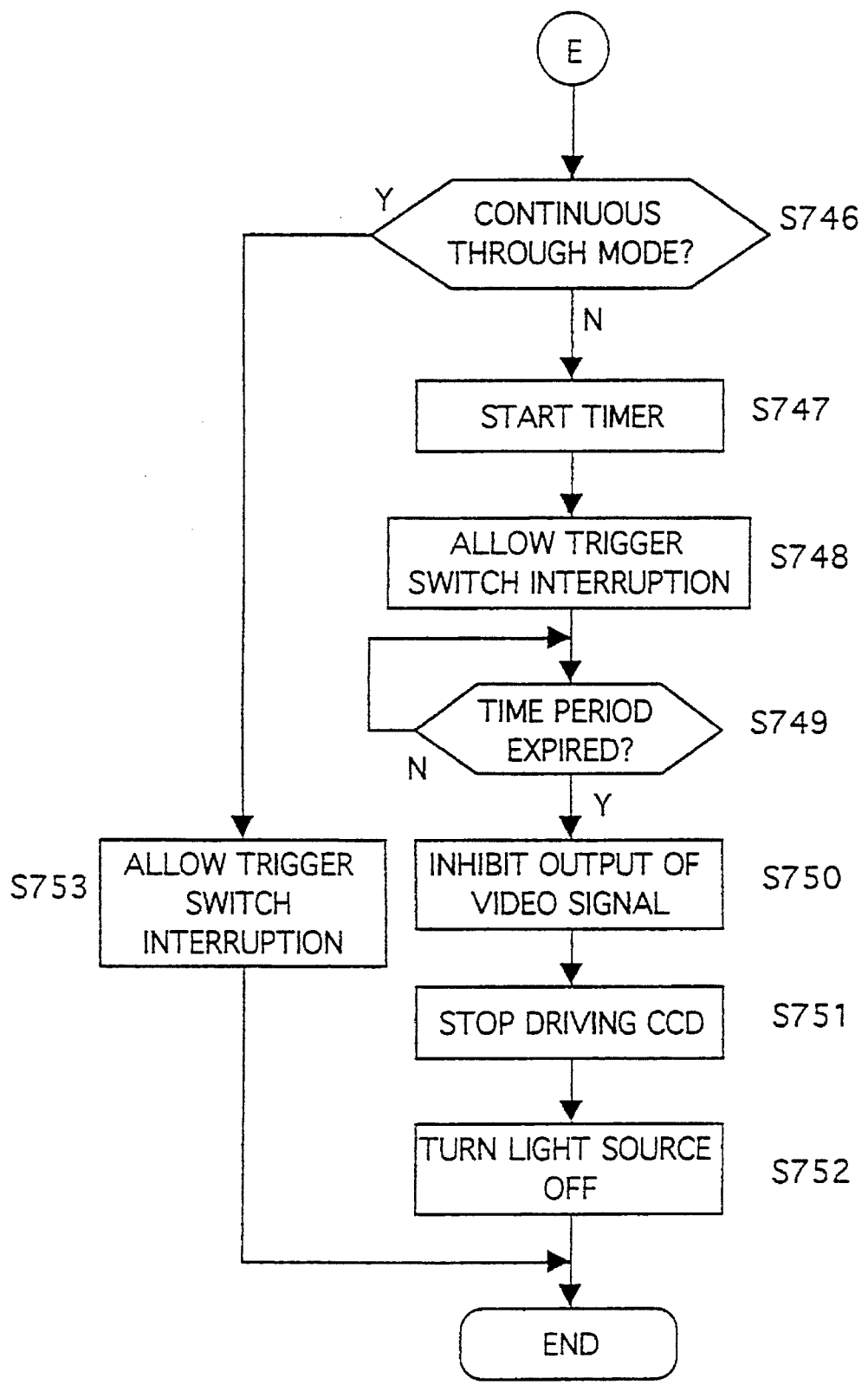

FIG. 16 is a flowchart illustrating a decoding procedure.

In the decoding procedure, an exclusive OR logical function is performed using the status of the image inversion detection switch 61 and the reverse picture command. Then the decoding of the lines is determined according to the XOR operation.

First, it is determined whether the image inversion detection switch 61 is on in step S601. Then, if the image inversion detection switch 61 is OFF (S601 equal to Y), at Step S602 it is determined whether the reverse picture command is received. If the reverse picture command is not received (S602 equal to N), then the image reversal mode is set to OFF, and the direction of the auxiliary scanning is set to a normal direction in step S604.

If the reverse picture command is received (S602 equal to Y), then the image reversal mode is set to ON, and the direction of the auxiliary scanning is set to a reverse direction in step S605.

If the image inversion detection switch 61 is turned ON in S601, then at step S603 it is determined whether the reverse picture command is received. If the reverse picture command is not received (S603 equal to N) the image reversal mode is set to ON and the auxiliary scanning direction is set to the reverse direction in step S605.

If the reverse picture command is received, the image reversal mode is set to OFF, and the auxiliary scanning direction is set to a forward direction in step S604.

After step S604 or S605 is executed, data for determining the number of cells is executed in step S606. Thereafter, the size of the symbol is measured, the magnification value M of the optical system 3 stored in the non-volatile memory 14 is read out, and the size of the cell stored in the non-volatile memory 14 is read out. The number of the cells is then determined according to the equation (4).

Then, using the primary image data, the cell data is generated based on the number of the cells. Further, as described above, the data of the first four cells on the first line are read in a predetermined order, and the appropriate cell data is determined in step S607. Then the cell data is converted into decode data.

As described above, according to the embodiment, the image data is not replaced in the memory, and the CCD 4 does not need to switch the addressing order when sending data to the memory. Further, the image does not need to be reversed. Furthermore, as when the image data is read from the memory, sampling of the data is performed such that one bit of data is output for each cell since the size of a cell is known.

The encoded symbol reader 1 according to the present invention reads the stored data out of the memory, according to four different scanning directions. Then a determination is made as to which of the read out data is correct.

For example, if the CCD 4 has a 500×500 pixel matrix, then the number of bits of data generated by the CCD 4 is 250,000. In the present embodiment, the 250,000 bits of pixel data is read once and converted to a small number of cell data (for example 20×20). This is stored in the memory and then read out according to the above described scanning directions. Since a small amount of data is read out of the memory the correct data can be determined quickly.

Further, in the embodiment, without deciding whether the data symbol is rotated, and regardless of whether the image is reversed, four types of data having different scanning directions are obtained and the correct image data is selected. Accordingly, the encoded symbol reader 1 can be used for many tasks, and the processing speed is relatively high.

Next, the trigger switch interruption procedure will be described with reference to the flowchart shown in FIGS. 17A, 17B, 18A, 18B, 19A and 19B.

The procedure starts when the trigger switch of the encoded symbol reader 1 is turned ON.

In the trigger switch interruption procedure, a subsequent interruption of the trigger switch is inhibited in step S701. Then, the integration interval $T_1$ of the CCD 4 is set in step S702. In step S703, the CCD 4 is driven by the CCD drive circuit 5. The light source 8 is turned ON by the light source drive circuit 9 in step S704, and transmission of the video signal to monitor 31 is enabled, in step S705.

Then, as in the illumination measurement mode procedure, the exposure level is examined in step S706. If the exposure level not proper (S706 equal to Y), then at step S707 it is determined whether the image is over exposed. If the image is over exposed (S707 equal to Y), then the integration interval $T_1$ of the CCD 4 is shortened according to the equation:

$$T_1 = T_1/\Delta T \text{ in step S708 where, } \Delta T > 1.$$

Then, step at step S709 it is determined whether $T_1 < T_S \cdot T_S$ is the lower limit value of the integration interval, as described before. If $T_1 \leq T_S$ (S709 equal to Y), control continues at step S706.

If the image is under exposed (S707 equal to N), then the integration interval $T_1$ is lengthened according to the equation:

$$T_1 = T_1 \times \Delta T \text{ in step S710 where, } \Delta T > 1.$$

Then step S711 determines whether $T_1 > T_L \cdot T_L$ is the upper limit value of the integration interval, as described before. If $T_1 \leq T_L$ (S711 equal to Y), then control continues at step S706. If $T_1 < T_S$ (S709:Y), then $T_1$ is set equal to $T_S$ in step S709A. Similarly, if $T_1 > T_L$ (S711 equal to Y), then $T_1$ is set equal to $T_L$ in step S711A. Exposure NG is then indicated in step S712 to alert a user that a proper exposure cannot be made.

If at step S713 it is determined that the current mode is the illumination measurement mode, then at step S714 the is cleared and the trigger interruption procedure ends.

If at step S706 it is determined that the exposure is proper, then at step S715 it is determined whether the current mode is the illumination measurement mode. If the mode is the illumination measurement mode (S715 equal to Y), then the uniformity of brightness is examined at step S716.

If the uniformity of brightness is acceptable at step S716, then the CCD image data is read out in step S717. In this step, the image signal is read out of the CCD 4 and is converted into a digital signal via the A/D converter 11. The digital image data is then transmitted to the CPU 15. The CCD image data is then stored as the brightness compensation values Eij in the compensation value storage area 53 of the non-volatile memory 14. More specifically, the brightness compensation values Eij are data corresponding to the brightness of the background of the symbol reading area when no encoded symbol 35 is being read. For example, in the illumination measurement mode, the background is illuminated and the image data is obtained using an exposure time of $T_1$. The obtained image data is then stored in the compensation value storage area 53 of the non-volatile memory 14 (as described above).

Next, in step S719, the display unit 21 indicates that the brightness compensation values Eij have been stored in the non-volatile memory 14. The illumination measurement mode is then cleared in step S721.

In the illumination measurement mode, it is preferable to use a background which is to be used when the encoded symbol 35 is read. However, a test chart may also be used to obtain accurate compensation values Eij.

If the brightness is not uniform (S716 equal to N), an indication that the compensation values have not been stored, is made in step S720. The illumination measurement mode is then cleared in step S721.

If the mode is not the illumination measurement mode (S715 equal to N), then the compensation values Eij that have already been stored in the storage area 53 of the non-volatile memory 14, are read in step S722.

Step S723 determines whether the current mode is the automatic threshold mode. If the mode is the automatic threshold mode (S723 equal to Y), as described before, the image data of the CCD 4 is read in step S725. The threshold value Sij are then calculated from the CCD image data in step S726. More specifically, the threshold values Sij are set as an intermediate value (usually an average value) of data corresponding to two adjacent pixels at a border where the pattern of the encoded symbol changes, the two adjacent pixels having different data (i.e., one is '1' and the other '0'). For the threshold values Sij corresponding to pixels having the same value (i.e., the pixels between the borders), the data calculated at the previous border is used. In other words, the calculated threshold value Sij is used for the other pixels until the threshold value of the next border is set.

If the mode is not the automatic threshold mode (i.e., the mode is the simplified threshold mode, S723 equal to N), the threshold values Sij are obtained from the compensation values Eij. The threshold values Sij are proportional to the compensation values Eij according to the equation:

$$Sij = Eij \times \alpha$$

shown in step S724, where α is a constant.

After the step S724 or S726 is completed, the main exposure is performed in step S727.

Then, in accordance with the threshold values Sij, the image signal obtained in the main exposure is converted into binary data in step S728. In step S729, the binary data is stored in the main memory 13 at predetermined addresses.

Next, as mentioned above, noise filtering is performed in step S730, and the sub-sampling operation is executed in step S731. In step S732, the sub-sampled data is stored in the main memory 13 at predetermined addresses. The symbol edge detection is then executed in step S733 based on the sub-sampled data.

At step S734 it is determined whether the current mode is the magnification measurement mode. If the mode is the magnification measurement mode (S734 equal to Y), then the size of the symbol on the CCD 4 is measured in step S741. The magnification value M of the optical system 3 is then calculated in step S742.

In step S743, the magnification value M is stored in the non-volatile memory 14 at a predetermined address. Then the indication that the magnification has been measured is made in step S744, and then the magnification measurement mode is cleared in step S745.

However, if the mode is not the magnification measurement mode (S734 equal to N) then the decoding procedure is performed on the binary data in step S735. The decoded data is then verified, in step S736. If the decoded data is verified then this is indicated in step S738, and the decoded data is output in step S738.

If the decoded data is not verified in step S736, then this is indicated in step S739, and an error code is output in step S740.

Control then proceeds to step S746 where it is determined whether the mode is the continuous through mode. If the mode is the continuous through mode (S746 equal to Y), then a subsequent trigger interruption procedure is allowed in step S753. The trigger interruption procedure then ends.

However, if it is determined in step S746 that continuous through mode is not set, the timer of the system control circuit 15 is started in step S747. The trigger interruption procedure is then allowed in step S748.

Step S749 determines whether the timer has elapsed. If the time has elapsed (S749 equal to Y), the transmission of the video signal to the monitor 31 is inhibited in step S750. The CCD drive circuit 5 then stops driving the CCD 4 in step S751, and the light source driving circuit 9 turns OFF the light source 8 in step S752.

In the embodiment, the communication data is transmitted from the computer 32 through the interface circuit 18, in order to execute the proper settings and registration of commands. However, it is also possible to directly input the settings and the commands using an operation panel or switches. Further, in this embodiment the monitor 31 is external to the encoded symbol reader 1. However, a built-in monitor could also be provided.

The indication of various information is not limited to the indication unit 21, but may also be performed by displaying characters or symbols on the monitor 31. The information may also be indicated by changing the brightness or color of an image seen on the monitor 31. Further, an audio indicator could be employed.

As shown in FIG. 1, the light projection unit 7 can be omitted. In this case, the illumination light is outputted by an external light source 33 controlled by an external light source driver 34. Alternatively, the light source can be an ambient light.

The reading unit 2 is not limited to having the structure shown in FIG. 1. The reading unit 2 can be constructed such that the light passes through a symbol to be read. Further, the reading unit 2 can be independent of the other units.

The optical device 3 can be constructed such that the distance between the optical device 3 and the object 35 is changeable, or unchangeable. The lens of the optical unit 3 can be exchangeable. Further, the an automatic focusing or zooming optical unit may be employed.

There is no limitation with respect to the shape of the encoded symbol reader 1. The encoded symbol reader 1 can be portable (i.e., hand held) unit or a desk top unit.

The encoded symbol reader 1 can be used for many purposes, e.g., the desk top unit can be used for reading the product information on a production line in a factory.

As above, according to the invention, even if the size of an image of the encoded symbol formed on an image sensor such as a CCD (charge coupled device) varies, the magnification of the image can be determined, and the encoded symbol can be decoded correctly.

The present disclosure relates to subject matter contained in Japanese Patent Application No. HEI 6-071577 filed on Mar. 16, 1994 which is expressly incorporated herein by reference in its entirety.

What is claimed is:

1. An encoded symbol reader for reading a two-dimensional encoded symbol, said encoded symbol having a matrix of cells, said encoded symbol reader comprising:

means for reading an image of said encoded symbol, said reading means outputting an electrical signal corresponding to said read image;

means for processing said output electrical signal; and means for storing information related to a processing of said output signal;

wherein said reading means comprises:
means for sensing said image; and
means for forming said image on said sensing means, and wherein said processing means comprises:
means for detecting a size of said image formed on said sensing means; and
means for calculating a magnification of said image forming means based on said size of said image detected by said detecting means and a size of said encoded symbol.

2. The encoded symbol reader according to claim 1, wherein said image forming means comprises an optical system, said image forming means forming said image of said encoded symbol on said sensing means.

3. The encoded symbol reader according to claim 1, further comprising means for storing said magnification calculated by said calculating means.

4. The encoded symbol reader according to claim 3, further comprising means for storing a size of pixel of said sensing means, wherein said detecting means detects a number of pixels of said sensing means corresponding to a length of said image formed on said sensing means, and wherein said size of said image is detected based on the size and the number of said pixel of said sensing means.

5. The encoded symbol reader according to claim 4, wherein said calculating means calculates said magnification according to the following equation:

$$M = \frac{Nsp \times Sp}{Lco \times Nc},$$

where,

Nsp represents said number of pixels

Sp represents a length of said pixel

Lco represents said length of a cell

Nc represents said number of cells.

6. The encoded symbol reader according to claim 1, wherein said size of said encoded symbol is based on a length of a cell and a number of cells in said encoded symbol.

7. The encoded symbol reader according to claim 6, further comprising:

means for storing said length of a cell of said encoded symbol;

means for storing said number of said cells in encoded symbol; and means for storing said number of said pixels corresponding to said size of said image.

8. The encoded symbol reader according to claim 1, further comprising means for receiving data related to at least one of said length of a cell and a number of cells in said encoded symbol.

9. The encoded symbol reader according to claim 1, said encoded symbol reader having a plurality of operating modes including a magnification measurement mode, and means for initiating a measurement operation, and wherein when a magnification measurement mode is selected and said initiating means is operated, said magnification of said image forming means is measured.

10. An encoded symbol reader for reading a two-dimensional encoded symbol, said encoded symbol having a matrix of cells, said encoded symbol reader comprising:

means for forming an image of said encoded symbol;

means for sensing said formed image;

means for detecting a size of said image formed on said sensing means;

means for calculating a magnification of said formed image based on said size of said image detected by said detecting means, a length of a cell and a number of said cells in said encoded symbol; and means for storing said measured magnification.

11. A method for determining a magnification of an encoded symbol reader for reading a two-dimensional encoded symbol, said encoded symbol having a matrix of cells, said method comprising the steps of:

forming an image of encoded symbol;

sensing said formed image;

detecting a size of said image;

calculating a magnification of said formed image based on said size of said image detected by said detecting step, and a length of said cell and a number of said cells in said encoded symbol; and storing said measured magnification.

12. An encoded symbol reader for reading a two-dimensional encoded symbol, said encoded symbol having a matrix of cells, said encoded symbol reader comprising:

means for forming an image of said encoded symbol;

means for sensing said formed image;

means for storing image magnification, the number of cells in said matrix, and a size of said cells; and means for decoding said encoded symbol in accordance with said image sensed by said sensing means, said image magnification, said number of cells, and said size of cells stored in said storing means.

\* \* \* \* \*

UNITED STATES PATENT AND TRADEMARK OFFICE
CERTIFICATE OF CORRECTION

PATENT NO. : 5,559,318
DATED : September 24, 1996
INVENTOR(S) : Harumi AOKI

It is certified that error appears in the above-indentified patent and that said Letters Patent is hereby corrected as shown below:

At column 18, line 64 (claim 7, line 5), delete "said" (second occurrence).

At column 18, line 64 (claim 7, line 5), after "cells in" insert ---said---.

Signed and Sealed this

Twenty-fifth Day of March, 1997

Attest:

BRUCE LEHMAN

*Attesting Officer*  *Commissioner of Patents and Trademarks*